US011509251B2

(12) United States Patent
Arisawa et al.

(10) Patent No.: US 11,509,251 B2
(45) Date of Patent: Nov. 22, 2022

(54) MOTOR DRIVING DEVICE AND AIR CONDITIONER

(71) Applicant: Mitsubishi Electric Corporation, Tokyo (JP)

(72) Inventors: Koichi Arisawa, Tokyo (JP); Takashi Yamakawa, Tokyo (JP); Kenji Iwazaki, Tokyo (JP); Keisuke Uemura, Tokyo (JP); Atsushi Tsuchiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 876 days.

(21) Appl. No.: 16/330,399

(22) PCT Filed: Oct. 31, 2016

(86) PCT No.: PCT/JP2016/082220
§ 371 (c)(1),
(2) Date: Mar. 5, 2019

(87) PCT Pub. No.: WO2018/078843
PCT Pub. Date: May 3, 2018

(65) Prior Publication Data
US 2020/0021223 A1 Jan. 16, 2020

(51) Int. Cl.
*H02P 25/18* (2006.01)
*F25B 49/02* (2006.01)
(Continued)

(52) U.S. Cl.
CPC .......... *H02P 25/184* (2013.01); *F25B 49/025* (2013.01); *H02K 1/276* (2013.01); *H02K 3/28* (2013.01); *F25B 2600/021* (2013.01)

(58) Field of Classification Search
CPC .......... H02P 21/14; H02P 21/00; H02P 21/06; H02P 27/06; H02P 21/10; H02P 21/18;
(Continued)

(56) References Cited

U.S. PATENT DOCUMENTS

2007/0290647 A1* 12/2007 Urakabe ................. H02P 25/20
318/494
2013/0248883 A1* 9/2013 Das ....................... H01L 25/072
257/77
(Continued)

FOREIGN PATENT DOCUMENTS

CN 103973200 A 8/2014
EP 2763310 A2 8/2014
(Continued)

OTHER PUBLICATIONS

Chinese Office Action dated Jan. 6, 2022 in corresponding Chinese Patent Application No. 201680089657.7 (and English translation).
(Continued)

*Primary Examiner* — Bickey Dhakal
(74) *Attorney, Agent, or Firm* — Posz Law Group, PLC

(57) ABSTRACT

A motor driving device is a device for driving a motor including stator windings, includes: a connection switching unit that is connected to the stator windings, includes circuits including semiconductor switches, and switches connection condition of the stator windings to either of first connection condition and second connection condition different from the first connection condition by setting the semiconductor switches to ON or OFF; and an inverter that supplies AC drive voltages to the stator windings.

16 Claims, 10 Drawing Sheets

(51) Int. Cl.
*H02K 1/276* (2022.01)
*H02K 3/28* (2006.01)

(58) Field of Classification Search
CPC .. H02P 6/18; H02P 21/22; H02P 21/24; H02P 2203/03; H02P 21/32; H02P 21/34
See application file for complete search history.

(56) References Cited

U.S. PATENT DOCUMENTS

| | | |
|---|---|---|
| 2014/0217946 A1 | 8/2014 | Kume et al. |
| 2015/0311845 A1* | 10/2015 | Nagata .................... H02P 21/26 318/400.02 |
| 2016/0204728 A1* | 7/2016 | Notohara .................. B60L 7/14 310/198 |
| 2017/0033720 A1* | 2/2017 | Zeyn ..................... H02P 25/184 |
| 2017/0133968 A1* | 5/2017 | Takahashi ............... H02K 3/345 |

FOREIGN PATENT DOCUMENTS

| | | |
|---|---|---|
| JP | H11-241852 A | 9/1999 |
| JP | 2006-246674 A | 9/2006 |
| JP | 2008-228513 A | 9/2008 |
| JP | 2011-199984 A | 10/2011 |
| JP | 2014-150685 A | 8/2014 |

OTHER PUBLICATIONS

International Search Report of the International Searching Authority dated Jan. 24, 2017 for the corresponding international application No. PCT/JP2016/082220 (and English translation).

\* cited by examiner

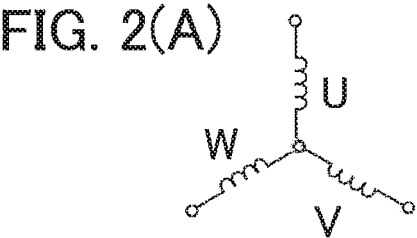
FIG. 2(A)
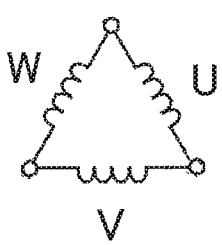
FIG. 2(B)
FIG. 3
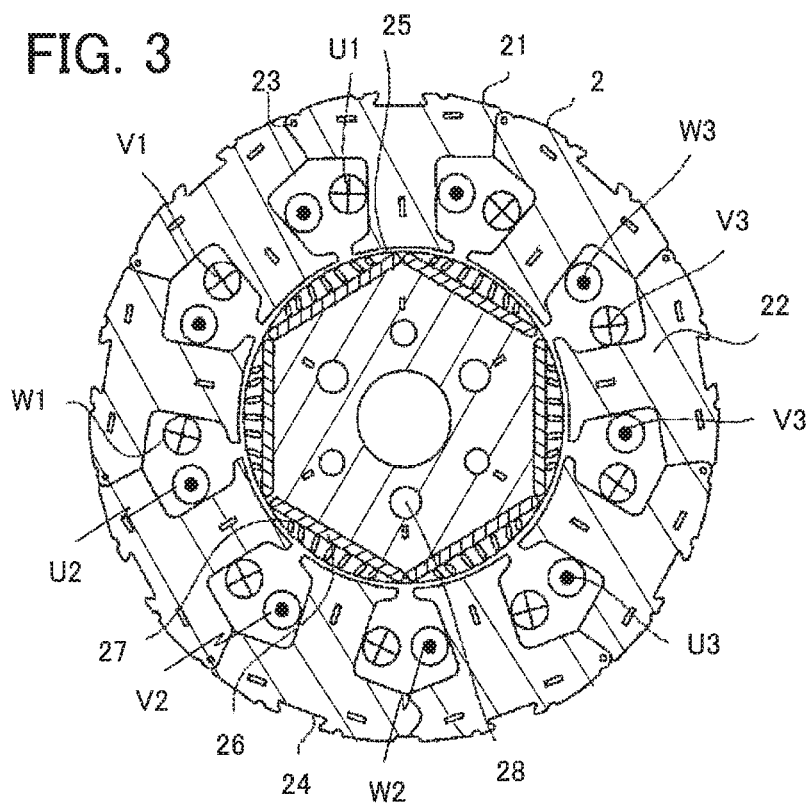
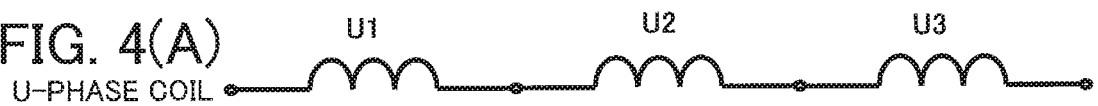
FIG. 4(A) U-PHASE COIL
FIG. 4(B) V-PHASE COIL
FIG. 4(C) W-PHASE COIL

U-PHASE COIL

V-PHASE COIL

W-PHASE COIL

| ON/OFF STATES OF MOS TRANSISTORS 311, 313, 315, 317 321, 323, 325, 327 331, 333, 335, 337 | | | | CONNECTION MODE |
|---|---|---|---|---|
| 311 321 331 | 313 323 333 | 315 325 335 | 317 327 337 | |
| ON | ON | OFF | OFF | DELTA CONNECTION |
| OFF | OFF | ON | ON | STAR CONNECTION |

FIG. 11

| 411 421 431 | 412 422 432 | 413 423 433 | 414 424 434 | 415 425 435 | 416 426 436 | 417 427 437 | 418 428 438 | CONN-ECTION MODE |
|---|---|---|---|---|---|---|---|---|
| ON | OFF | ON | OFF | OFF | OFF | OFF | OFF | DELTA CONN-ECTION |
| OFF | OFF | OFF | OFF | ON | OFF | ON | OFF | STAR CONN-ECTION |

ON/OFF STATES OF MOS TRANSISTORS 411 – 418, 421 – 428, 431 – 438

FIG. 12

| 411 421 431 | 412 422 432 | 413 423 433 | 414 424 434 | 415 425 435 | 416 426 436 | 417 427 437 | 418 428 438 | CONN-ECTION MODE |
|---|---|---|---|---|---|---|---|---|
| ON | OFF OR ON | ON | OFF OR ON | OFF | OFF OR ON | OFF | OFF OR ON | DELTA CONN-ECTION |
| OFF | OFF OR ON | OFF | OFF OR ON | ON | OFF OR ON | ON | OFF OR ON | STAR CONN-ECTION |

ON/OFF STATES OF MOS TRANSISTORS 411 – 418, 421 – 428, 431 – 438

MOTOR DRIVING DEVICE AND AIR CONDITIONER

CROSS REFERENCE TO RELATED APPLICATION

This application is a U.S. national stage application of International Patent Application No. PCT/JP2016/082220 filed on Oct. 31, 2016, the disclosure of which is incorporated herein by reference.

TECHNICAL FIELD

The present invention relates to a motor driving device for driving a motor and to an air conditioner including a motor driving device for driving a motor for a compressor.

BACKGROUND ART

Cooling capacity and heating capacity of an air conditioner (A/C) can be adjusted by changing a rotational speed of a motor for a compressor. For example, at startup of the air conditioner, a quick cooling operation or a quick heating operation is performed by making the motor rotate at high speed, and after the room temperature has reached a requested temperature, an energy-saving operation is performed by making the motor rotate at low speed. Since the time of the energy-saving operation is generally long, using a motor having high efficiency in low speed rotation is desirable for reducing the annual electric energy consumption. Further, to raise the maximum capacity of cooling and heating, it is desirable to use a motor capable of high speed rotation.

As the motor for a compressor, permanent magnet motors including a permanent magnet in the rotor are widely used in order to increase the efficiency. As a device for driving a motor, motor driving devices including an inverter have become widespread. In a permanent magnet motor, increasing the number of turns of a stator winding enables operation with a smaller amount of current, decreases inverter loss due to the current, and enables operation with higher efficiency. However, increasing the number of turns of the stator winding leads to a rise in inductive voltage, and thus motor voltage ruled by the inductive voltage reaches the maximum output voltage of the inverter at a low rotational speed and operation at higher rotational speeds is impossible.

In contrast, decreasing the number of turns of the stator winding lowers the inductive voltage, and thus the motor voltage ruled by the inductive voltage hardly reaches the maximum output voltage of the inverter and the motor can be operated in high speed rotation. However, decreasing the number of turns of the stator winding increases the current flowing into the stator winding, and thus the inverter loss due to the current increases and operation with high efficiency becomes impossible.

As above, permanent magnet motors with high efficiency in low speed rotation cannot be operated in high speed rotation, and permanent magnet motors that can be operated in high speed rotation are low in the efficiency in low speed rotation. To eliminate this problem, there has been proposed a motor driving device including a connection switching unit that switches stator windings of a motor receiving drive voltage supplied from an inverter between star connection and delta connection (see Patent Reference 1, for example).

PATENT REFERENCE

Patent Reference 1: Japanese Patent Application Publication No. 2006-246674 (claim 1, paragraphs 0016 to 0020 and 0047 to 0048, FIG. 1, FIG. 2 and FIG. 7)

However, since switches in the connection switching unit of the motor driving device described in the Patent Reference 1 are mechanical switches needing a long time (switching time) for the switching between an ON state and an OFF state, the switching of the connection condition has to be made during the stoppage (interruption) of the operation of the motor for the compressor. In this case, there occurs electric power consumption for restarting the operation of the motor for the compressor, and thus the operating efficiency cannot be increased sufficiently and the energy saving effect has been insufficient.

SUMMARY

The object of the present invention is to provide a motor driving device capable of driving a motor in high speed rotation and driving the motor with high efficiency in low speed rotation and an air conditioner capable of achieving both of high cooling/heating capacity and operation with great energy saving effect.

A motor driving device according to an aspect of the present invention is a motor driving device for driving a motor including stator windings, including: a connection switching unit that includes a circuit including a semiconductor switch and switches connection condition of the stator windings to either of first connection condition and second connection condition different from the first connection condition by setting the semiconductor switch to ON or OFF; and an inverter that supplies AC drive voltages to the stator windings.

An air conditioner according to another aspect of the present invention is an air conditioner including a motor including stator windings, a compressor driven by the motor, and a motor driving device that drives the motor. The motor driving device includes: a connection switching unit that includes a circuit including a semiconductor switch and switches connection condition of the stator windings to either of first connection condition and second connection condition different from the first connection condition by setting the semiconductor switch to ON or OFF; and an inverter that supplies AC drive voltages to the stator windings.

With the motor driving device according to the present invention, the connection condition of the stator windings can be switched appropriately by setting the semiconductor switch to ON or OFF, and thus the motor can be driven in high speed rotation, and the motor can be driven with high efficiency in low speed rotation.

Further, with the motor driving device according to the present invention, the operation of the motor does not necessarily have to be interrupted for the switching of the connection condition, and thus the motor can be driven with high efficiency and great energy saving effect can be achieved.

Furthermore, the air conditioner according to the present invention includes the motor driving device described above, and thus it is possible to achieve both of the high cooling/heating capacity due to high speed rotation of the motor for the compressor and the energy-saving operation of the motor for the compressor.

BRIEF DESCRIPTION OF THE DRAWINGS

FIGS. 2(A) and 2(B) are diagrams showing star connection and delta connection.

FIG. 3 is a cross-sectional view schematically showing internal structure of a motor shown in FIG. 1.

FIGS. 4(A) to 4(C) are diagrams showing U-phase windings connected in series, V-phase windings connected in series, and W-phase windings connected in series.

FIG. 11 is a diagram showing an example of ON and OFF states of the semiconductor switches in the circuit shown in FIG. 10 in a tabular form.

FIG. 12 is a diagram showing another example of ON and OFF states of the semiconductor switches in the circuit shown in FIG. 10 in a tabular form.

DETAILED DESCRIPTION (1) First Embodiment

Figure 1:
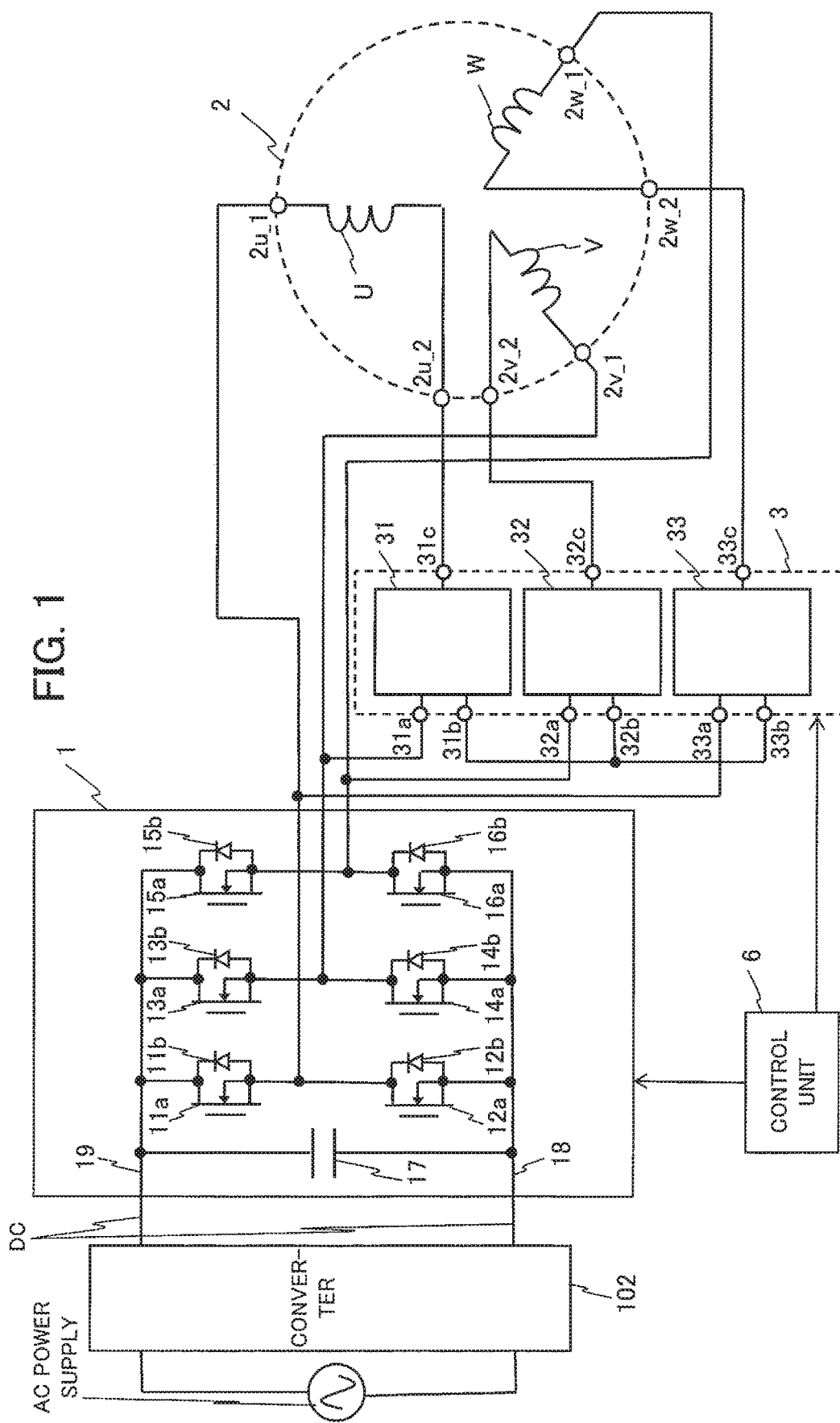
FIG. 1 is a diagram schematically showing a configuration of a motor driving device according to a first embodiment of the present invention.

FIG. 1 is a diagram schematically showing a configuration of a motor driving device according to a first embodiment of the present invention. FIGS. 2(A) and 2(B) are diagrams showing star connection (Y connection) and delta connection (Δ connection).

As shown in FIG. 1, the motor driving device according to the first embodiment is a device that is connected to a converter 102 converting AC voltage supplied from an AC power supply into DC voltage and drives a motor 2 including stator windings of three phases, namely, a U-phase, a V-phase and a W-phase.

The motor driving device according to the first embodiment includes an inverter 1 that converts the DC voltage into AC drive voltages to be supplied to an open winding (first open winding) U, an open winding (second open winding) V and an open winding (third open winding) W that are the stator windings, a connection switching unit 3 that switches connection condition of the open winding U, the open winding V and the open winding W to either of first connection condition and second connection condition different from the first connection condition, and a control unit 6 that controls the inverter 1 and the connection switching unit 3. Further, the motor driving device may also include the converter 102.

In the first embodiment, the first connection condition is condition of the star connection in which neutral points are connected together by the connection switching unit 3, and the second connection condition is condition of the delta connection. However, the number of phases of the stator windings of the motor 2 is not limited to three but can also be two or four or more.

The open winding U includes a winding terminal (first winding terminal) $2u\_1$ connected to a U-phase output terminal of the inverter 1 and a winding terminal (second winding terminal) $2u\_2$ connected to the connection switching unit 3. The open winding V includes a winding terminal (third winding terminal) $2v\_1$ connected to a V-phase output terminal of the inverter 1 and a winding terminal (fourth winding terminal) $2v\_2$ connected to the connection switching unit 3. The open winding W includes a winding terminal (fifth winding terminal) $2w\_1$ connected to a W-phase output terminal of the inverter 1 and a winding terminal (sixth winding terminal) $2w\_2$ connected to the connection switching unit 3.

As shown in FIG. 1, the inverter 1 includes MOS transistors (MOSFETs: Metal-Oxide-Semiconductor Field-Effect Transistors) $11a$ and $12a$ as switches connected in series between electric power supply lines 18 and 19 to which the DC voltage is supplied, MOS transistors $13a$ and $14a$ as switches connected in series between the electric power supply lines 18 and 19, MOS transistors $15a$ and $16a$ as switches connected in series between the electric power supply lines 18 and 19, and a capacitor 17 connected between the electric power supply lines 18 and 19. In the inverter 1, the MOS transistors $11a$, $13a$ and $15a$ are upper arms, while the MOS transistors $12a$, $14a$ and $16a$ are lower arms.

The electric power supply lines 18 and 19 are busses supplied with the DC voltage outputted from the converter 102 converting the AC voltage into the DC voltage. The U-phase output terminal of the inverter 1 is connected to a node between the MOS transistors $11a$ and $12a$, the V-phase output terminal of the inverter 1 is connected to a node between the MOS transistors $13a$ and $14a$, and the W-phase output terminal of the inverter 1 is connected to a node between the MOS transistors $15a$ and $16a$. Each MOS transistor $11a$, $12a$, $13a$, $14a$, $15a$, $16a$ turns on (conduction between the source and the drain) or off (non-conduction between the source and the drain) according to an inverter drive signal outputted from the control unit 6, that is, a gate control signal for the MOS transistor.

The inverter 1 further includes parasitic diodes $11b$, $12b$, $13b$, $14b$, $15b$ and $16b$ as diodes respectively connected in parallel with the MOS transistors $11a$, $12a$, $13a$, $14a$, $15a$ and $16a$. However, the configuration of the inverter 1 is not limited to the configuration shown in FIG. 1.

As shown in FIG. 1, the connection switching unit 3 includes circuits each including semiconductor switches (e.g., MOS transistors shown in FIG. 6 which will be explained later), namely, a switch circuit (first switch circuit) 31, a switch circuit (second switch circuit) 32 and a switch circuit (third switch circuit) 33.

The switch circuit 31 has a first terminal $31a$ connected to the V-phase output terminal of the inverter 1, a second terminal $31b$ connected to a fifth terminal $32b$ of the switch circuit 32 and an eighth terminal $33b$ of the switch circuit 33 which will be described later, and a third terminal $31c$ connected to the winding terminal 2u_2 of the open winding U and connected to one of the first terminal 31a and the second terminal 31b.

The switch circuit 32 has a fourth terminal 32a connected to the W-phase output terminal of the inverter 1, the fifth terminal 32b connected to the second terminal 31b of the switch circuit 31 and the eighth terminal 33b of the switch circuit 33, and a sixth terminal 32c connected to the winding terminal 2v_2 of the open winding V and connected to one of the fourth terminal 32a and the fifth terminal 32b.

The switch circuit 33 has a seventh terminal 33a connected to the U-phase output terminal of the inverter 1, the eighth terminal 33b connected to the second terminal 31b of the switch circuit 31 and the fifth terminal 32b of the switch circuit 32, and a ninth terminal 33c connected to the winding terminal 2w_2 of the open winding W and connected to one of the seventh terminal 33a and the eighth terminal 33b.

In the connection switching unit 3, turning on (conduction between the source and the drain) or off (non-conduction between the source and the drain) of each semiconductor switch is controlled according to a connection switching signal outputted from the control unit 6 (e.g., gate control signal for each MOS transistor as each semiconductor switch shown in FIG. 6 which will be explained later). The connection switching unit 3 switches the connection condition of the stator windings of the motor 2 to the star connection (FIG. 2(A)), as the first connection condition in which the neutral points are connected together by the connection switching unit 3, by connecting the second terminal 31b and the third terminal 31c together in the switch circuit 31, connecting the fifth terminal 32b and the sixth terminal 32c together in the switch circuit 32, and connecting the eighth terminal 33b and the ninth terminal 33c together in the switch circuit 33.

Further, the connection switching unit 3 switches the connection condition to the delta connection (FIG. 2(B)) that is the second connection condition by connecting the first terminal 31a and the third terminal 31c together in the switch circuit 31, connecting the fourth terminal 32a and the sixth terminal 32c together in the switch circuit 32, and connecting the seventh terminal 33a and the ninth terminal 33c together in the switch circuit 33. Incidentally, while the switch circuits 31, 32 and 33 are shown in FIG. 1 as components independent of each other, the switch circuits 31, 32 and 33 may also be circuits arranged on the same circuit board.

FIG. 3 is a cross-sectional view schematically showing internal structure of the motor 2 shown in FIG. 1. As shown in FIG. 3, the motor 2 is a permanent magnet motor in which permanent magnets 26 are embedded in a rotor 25. The motor 2 includes a stator 21 and the rotor 25 arranged in a space on a central side of the stator 21 and supported to be rotatable around a shaft. An air gap is secured between an outer circumferential surface of the rotor 25 and an inner circumferential surface of the stator 21. The air gap between the stator 21 and the rotor 25 is a clearance of approximately 0.3 mm to 1 mm. Specifically, the rotor 25 is rotated by energizing the stator windings with electric current in sync with a command revolution speed by use of the inverter 1 and generating a rotating magnetic field.

Windings U1 to U3, windings V1 to V3, and windings W1 to W3 are wound around tooth parts 22 of the stator 21 via insulating material by means of concentrated winding. The windings U1 to U3 correspond to the open winding U in FIG. 1, the windings V1 to V3 correspond to the open winding V in FIG. 1, and the windings W1 to W3 correspond to the open winding W in FIG. 1.

The stator 21 shown in FIG. 3 is formed of a plurality of split cores arranged in a ring-like shape around a rotation axis 23 when adjacent split cores are connected together, and the split cores arranged in a ring-like shape (a state in which the split cores are closed) can be turned into the split cores arranged in a straight line (a state in which the split cores are open) by opening the tooth parts 22 adjacently arranged. With this configuration, the winding process can be performed in a state in which the split cores are arranged in a straight line and the tooth parts 22 have wide spaces between each other, by which the winding process can be simplified and winding quality can be improved (e.g., occupancy ratio can be increased).

As the permanent magnets 26 embedded in the rotor 25, rare-earth magnets or ferrite magnets are employed, for example. Slits 27 are arranged in outer circumferential core parts of the permanent magnets 26. The slits 27 have a function of lessening the influence of armature reaction caused by the electric current of the stator windings and reducing the superimposition of harmonics on the magnetic flux distribution. Further, the core of the stator 21 and the core of the rotor 25 are provided with air vents 24 and 28. The air vents 24 and 28 have a function of cooling down the motor 2 while serving as refrigerant gas channels or oil return channels.

The motor 2 shown in FIG. 3 has structure of concentrated winding in which the ratio between the number of magnetic poles and the number of slots is 2:3. The motor 2 includes the rotor having permanent magnets for six poles and the stator 21 having nine slots (nine tooth parts). Thus, the motor 2, being a six-pole motor having six permanent magnets, employs structure having windings on three tooth parts (three slots) per phase. In a case of a four-pole motor, the number of tooth parts (the number of slots) is six and it is desirable to employ structure having windings on two tooth parts per phase. In a case of an eight-pole motor, the number of tooth parts is twelve and it is desirable to employ structure having windings on four tooth parts per phase.

When three-phase windings are used in the delta connection, there are cases where circulating current flows in the windings of the motor 2 and deteriorates the performance of the motor 2. The circulating current flows due to the third harmonic of inductive voltage in the winding of each phase, and in the case of the concentrated winding in which the ratio between the number of magnetic poles and the number of slots is 2:3, no third harmonic occurs in the inductive voltage due to phase relationship between the windings and the permanent magnets as long as there is no influence of magnetic saturation or the like. In the first embodiment, the motor 2 is configured with the concentrated winding in which the ratio between the number of magnetic poles and the number of slots is 2:3 in order to inhibit the circulating current in use of the motor 2 in the delta connection.

However, the number of magnetic poles, the number of slots, and the winding method (concentrated winding, distributed winding) may be properly selected depending on required motor size, characteristics (revolution speed, torque, etc.), voltage specifications, cross-sectional area of the slots, and so forth. Further, the structure of the motor to which the present invention is applicable is not limited to that shown in FIG. 3.

Figure 5A:
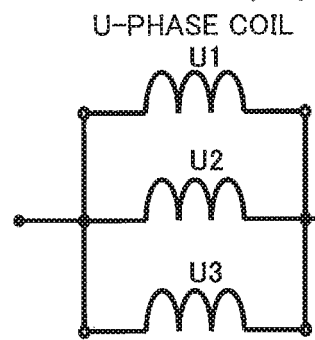
FIGS. 5(A) to 5(C) are diagrams showing U-phase windings connected in parallel, V-phase windings connected in parallel, and W-phase windings connected in parallel.
Figure 5B:
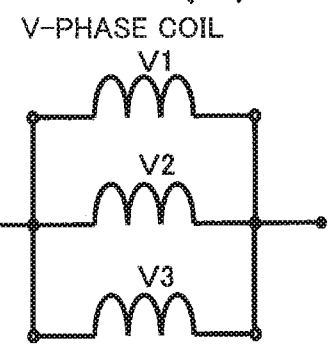
Figure 5C:
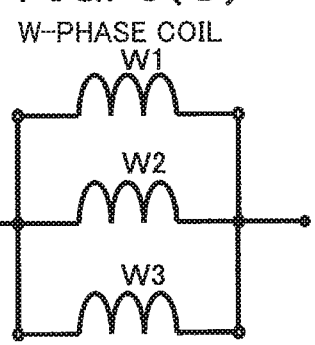

FIGS. 4(A) to 4(C) show an example of the windings shown in FIG. 3, namely, the windings U1, U2 and U3 connected in series, the windings V1, V2 and V3 connected in series, and the windings W1, W2 and W3 connected in series. FIGS. 5(A) to 5(C) show another example of the windings shown in FIG. 3, namely, the windings U1, U2 and U3 connected in parallel, the windings V1, V2 and V3 connected in parallel, and the windings W1, W2 and W3 connected in parallel.

Figure 6:
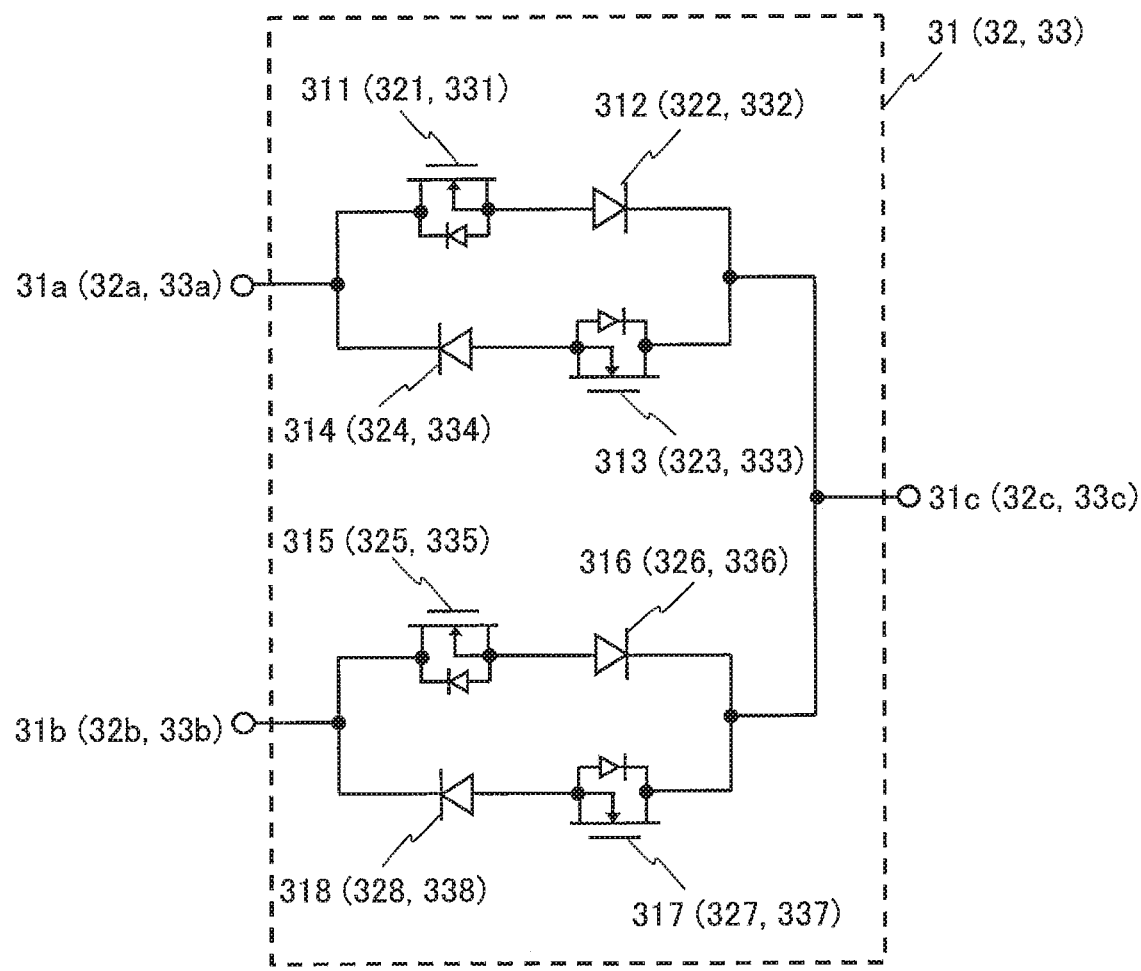
FIG. 6 is a circuit diagram showing a circuit including semiconductor switches in the motor driving device shown in FIG. 1.

FIG. 6 is a circuit diagram showing the switch circuits 31, 32 and 33 of the connection switching unit 3 in the motor driving device shown in FIG. 1. The switch circuits 31, 32 and 33 have the same configuration as each other, and thus the configuration of the switch circuit 31 will be described below as the representative.

As shown in FIG. 6, the switch circuit 31 includes a MOS transistor (first MOS transistor) 311 and a diode (first diode) 312 connected in series between the first terminal 31a and the third terminal 31c, and a MOS transistor (second MOS transistor) 313 and a diode (second diode) 314 connected in series between the third terminal 31c and the first terminal 31a.

The MOS transistor 311 includes a parasitic diode having an anode connected to the diode 312 and a cathode connected to the first terminal 31a, and current does not flow from the first terminal 31a towards the diode 312 unless the MOS transistor 311 shifts to an ON state. The diode 312, having an anode connected to the MOS transistor 311 and a cathode connected to the third terminal 31c, is capable of blocking current flowing from the third terminal 31c to the MOS transistor 311 and conducting current in a direction heading from the first terminal 31a to the third terminal 31c via the MOS transistor 311 in the ON state.

The MOS transistor 313 includes a parasitic diode having an anode connected to the diode 314 and a cathode connected to the third terminal 31c, and current does not flow from the third terminal 31c towards the diode 314 unless the MOS transistor 313 shifts to the ON state. The diode 314, having an anode connected to the MOS transistor 313 and a cathode connected to the first terminal 31a, is capable of blocking current flowing from the first terminal 31a to the MOS transistor 313 and conducting current in a direction heading from the third terminal 31c to the first terminal 31a via the MOS transistor 313 in the ON state.

The switch circuit 31 further includes a MOS transistor (third MOS transistor) 315 and a diode (third diode) 316 connected in series between the second terminal 31b and the third terminal 31c, and a MOS transistor (fourth MOS transistor) 317 and a diode (fourth diode) 318 connected in series between the third terminal 31c and the second terminal 31b.

The MOS transistor 315 includes a parasitic diode having an anode connected to the diode 316 and a cathode connected to the second terminal 31b, and current does not flow from the second terminal 31b towards the diode 316 unless the MOS transistor 315 shifts to the ON state. The diode 316, having an anode connected to the MOS transistor 315 and a cathode connected to the third terminal 31c, is capable of blocking current flowing from the third terminal 31c to the MOS transistor 315 and conducting current in a direction heading from the second terminal 31b to the third terminal 31c via the MOS transistor 315 in the ON state.

The MOS transistor 317 includes a parasitic diode having an anode connected to the diode 318 and a cathode connected to the third terminal 31c, and current does not flow from the third terminal 31c towards the diode 318 unless the MOS transistor 317 shifts to the ON state. The diode 318, having an anode connected to the MOS transistor 317 and a cathode connected to the second terminal 31b, is capable of blocking current flowing from the second terminal 31b to the MOS transistor 317 and conducting current in a direction heading from the third terminal 31c to the second terminal 31b via the MOS transistor 317 in the ON state.

As shown in FIG. 6, the switch circuits 31, 32 and 33 have the same configuration as each other and operate in the same way, and thus explanation of the configuration and operation of the switch circuits 32 and 33 is omitted. The explanation is omitted by replacing the number 31 in the reference character representing each component of the switch circuit 31 with 32 in regard to the switch circuit 32 and with 33 in regard to the switch circuit 33.

Namely, the configuration of the switch circuit 32 is the same as that obtained by respectively replacing the first terminal 31a, the second terminal 31b, the third terminal 31c, the MOS transistor 311, the diode 312, the MOS transistor 313, the diode 314, the MOS transistor 315, the diode 316, the MOS transistor 317 and the diode 318 constituting the switch circuit 31 with the fourth terminal 32a, the fifth terminal 32b, the sixth terminal 32c, a MOS transistor (fifth MOS transistor) 321, a diode (fifth diode) 322, a MOS transistor (sixth MOS transistor) 323, a diode (sixth diode) 324, a MOS transistor (seventh MOS transistor) 325, a diode (seventh diode) 326, a MOS transistor (eighth MOS transistor) 327 and a diode (eighth diode) 328.

Further, the configuration of the switch circuit 33 is the same as that obtained by respectively replacing the first terminal 31a, the second terminal 31b, the third terminal 31c, the MOS transistor 311, the diode 312, the MOS transistor 313, the diode 314, the MOS transistor 315, the diode 316, the MOS transistor 317 and the diode 318 constituting the switch circuit 31 with the seventh terminal 33a, the eighth terminal 33b, the ninth terminal 33c, a MOS transistor (ninth MOS transistor) 331, a diode (ninth diode) 332, a MOS transistor (tenth MOS transistor) 333, a diode (tenth diode) 334, a MOS transistor (eleventh MOS transistor) 335, a diode (eleventh diode) 336, a MOS transistor (twelfth MOS transistor) 337 and a diode (twelfth diode) 338.

Figures 7, 8:
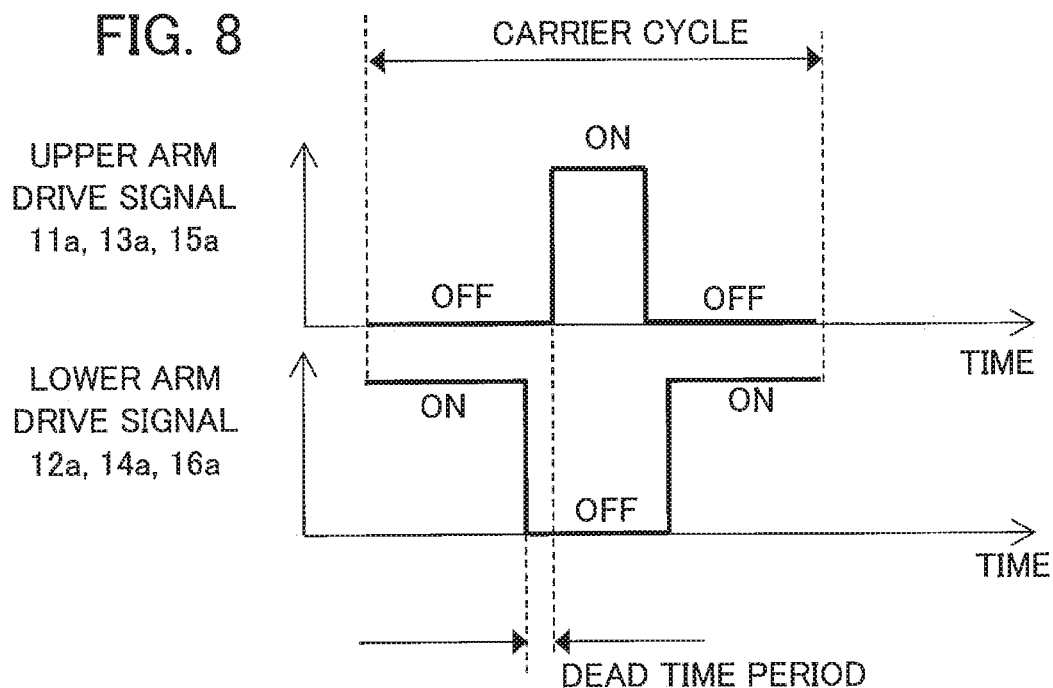
FIG. 7 is a diagram showing an example of ON and OFF states of the semiconductor switches in the circuit shown in FIG. 6 in a tabular form.
FIG. 8 is a timing chart showing a dead time in an inverter shown in FIG. 1.

FIG. 7 is a diagram showing an example of ON and OFF states of the MOS transistors 311, 313, 315, 317, 321, 323, 325, 327, 331, 333, 335 and 337 as the semiconductor switches in the switch circuits 31, 32 and 33 shown in FIG. 6 in a tabular form. The switch circuits 31, 32 and 33 have the same configuration as each other and operate in the same way according to the gate control signal for the MOS transistors as the connection switching signal outputted from the control unit 6.

As shown in FIG. 7, the connection switching unit 3 is capable of switching the connection condition of the stator windings to the star connection that is the first connection condition by setting the MOS transistors (first, second, fifth, sixth, ninth and tenth MOS transistors) 311, 313, 321, 323, 331 and 333 in the OFF state (non-conduction between the source and the drain) and setting the MOS transistors (third, fourth, seventh, eighth, eleventh and twelfth MOS transistors) 315, 317, 325, 327, 335 and 337 in the ON state (conduction between the source and the drain).

In this case, current heading from the second terminal 31b to the third terminal 31c flows from the second terminal 31b to the third terminal 31c through the MOS transistor 315 in the ON state and the diode 316, and current heading from the third terminal 31c to the second terminal 31b flows from the third terminal 31c to the second terminal 31b through the MOS transistor 317 in the ON state and the diode 318.

Similarly, current heading from the fifth terminal 32b to the sixth terminal 32c flows from the fifth terminal 32b to the sixth terminal 32c through the MOS transistor 325 in the ON state and the diode 326, and current heading from the sixth terminal 32c to the fifth terminal 32b flows from the sixth terminal 32c to the fifth terminal 32b through the MOS transistor 327 in the ON state and the diode 328.

Similarly, current heading from the eighth terminal 33b to the ninth terminal 33c flows from the eighth terminal 33b to the ninth terminal 33c through the MOS transistor 335 in the ON state and the diode 336, and current heading from the ninth terminal 33c to the eighth terminal 33b flows from the ninth terminal 33c to the eighth terminal 33b through the MOS transistor 337 in the ON state and the diode 338.

Further, as shown in FIG. 7, the connection switching unit 3 is capable of switching the connection condition of the stator windings to the delta connection that is the second connection condition by setting the MOS transistors (first, second, fifth, sixth, ninth and tenth MOS transistors) 311, 313, 321, 323, 331 and 333 in the ON state (conduction between the source and the drain) and setting the MOS transistors (third, fourth, seventh, eighth, eleventh and twelfth MOS transistors) 315, 317, 325, 327, 335 and 337 in the OFF state (non-conduction between the source and the drain).

In this case, current heading from the first terminal 31a to the third terminal 31c flows from the first terminal 31a to the third terminal 31c through the MOS transistor 311 in the ON state and the diode 312, and current heading from the third terminal 31c to the first terminal 31a flows from the third terminal 31c to the first terminal 31a through the MOS transistor 313 in the ON state and the diode 314.

Similarly, current heading from the fourth terminal 32a to the sixth terminal 32c flows from the fourth terminal 32a to the sixth terminal 32c through the MOS transistor 321 in the ON state and the diode 322, and current heading from the sixth terminal 32c to the fourth terminal 32a flows from the sixth terminal 32c to the fourth terminal 32a through the MOS transistor 323 in the ON state and the diode 324.

Similarly, current heading from the seventh terminal 33a to the ninth terminal 33c flows from the seventh terminal 33a to the ninth terminal 33c through the MOS transistor 331 in the ON state and the diode 332, and current heading from the ninth terminal 33c to the seventh terminal 33a flows from the ninth terminal 33c to the seventh terminal 33a through the MOS transistor 333 in the ON state and the diode 334.

A switching time necessary for the switching of the MOS transistors (first to twelfth MOS transistors) 311, 313, 315, 317, 321, 323, 325, 327, 331, 333, 335 and 337 that is the semiconductor switches of the connection switching unit 3 between the ON state and the OFF state is desired to be within 1 ms.

In a case of mechanical switches, the switching time is generally some hundred milliseconds, and thus operation of the motor 2 has to be stopped (in a case of an air conditioner, operation of the compressor driven by the motor has to be stopped) to switch the connection condition, and operating efficiency can drop during the stoppage.

The switching time of MOS transistors as semiconductor switches is generally less than 10 µs. Thus, by setting the switching time of the semiconductor switches of the connection switching unit 3 within 1 ms, the connection condition can be switched without stopping the operation of the motor 2 and the operating efficiency can be maintained. However, it is also possible to perform the switching of the semiconductor switches of the connection switching unit 3 in an operation stoppage (interruption) period of the motor 2.

Further, the MOS transistors (first to twelfth MOS transistors) 311, 313, 315, 317, 321, 323, 325, 327, 331, 333, 335 and 337 as the semiconductor switches are desired to be wide band gap (WBG) semiconductors. The WBG semiconductor is, for example, a semiconductor containing silicon carbide (SiC) or gallium nitride (GaN) as a constituent material. In a case where WBG semiconductors are used as the MOS transistors (first to twelfth MOS transistors) 311, 313, 315, 317, 321, 323, 325, 327, 331, 333, 335 and 337, the switching time can be shortened to less than 10 ns, which is ideal for performing the switching of the connection condition without stopping the motor.

FIG. 8 is a timing chart showing a dead time in the inverter 1 shown in FIG. 1. FIG. 8 shows behavior of an upper arm drive signal (gate control signal) for switching the MOS transistors 11a, 13a and 15a as the upper arms to the ON state or the OFF state and a lower arm drive signal (gate control signal) for switching the MOS transistors 12a 14a and 16a as the lower arms to the ON state or the OFF state.

A short circuit occurs between the electric power supply lines 18 and 19 when an ON period of the upper arm drive signal and an ON period of the lower arm drive signal overlap with each other, and thus it is essential to securely avoid the short circuit between the electric power supply lines 18 and 19. Therefore, it has conventionally been necessary to secure a dead time period, in which the upper arm drive signal and the lower arm drive signal are not in the ON state together, between a start time point of the OFF period of the lower arm drive signal and a start time point of the ON period of the upper arm drive signal.

The dead time period is approximately 10 µs when the carrier wavelength is 250 µs, for example. Thus, influence of the switching of the connection switching unit 3 in the middle of the operation of the motor on the system including the motor driving device can be eliminated by setting the switching time of the semiconductor switches of the connection switching unit 3 at less than 10 µs that is the dead time and performing the switching of the semiconductor switches of the connection switching unit 3 between the ON state and the OFF state in the dead time period of the semiconductor switches of the inverter 1.

As described above, with the motor driving device according to the first embodiment, the connection condition of the stator windings can be switched appropriately by the switching of the MOS transistors that are the semiconductor switches included in the connection switching unit 3 between the ON state and the OFF state, and thus the motor 2 can be driven in high speed rotation, and the motor 2 can be driven with high efficiency in low speed rotation.

Further, with the motor driving device according to the first embodiment, the operation of the motor 2 does not necessarily have to be stopped (interrupted) for the switching of the connection condition, and thus the motor 2 can be driven with high efficiency. Especially when MOS transistors of a short switching time are used as the semiconductor switches for the connection switching unit 3 of the motor driving device, even switching the connection condition in the middle of the operation of the motor has little influence on the motor driving device, and the system (e.g., air conditioner) including the motor driving device can be operated normally.

Furthermore, in a case where WBG transistors of a short switching time are used as the semiconductor switches for the connection switching unit 3 in the motor driving device according to the first embodiment, the switching of the connection condition can be completed in the dead time period of the inverter 1, and thus the switching of the connection condition in the middle of the operation of the motor 2 can be carried out with no influence on the system (e.g., air conditioner) including the motor driving device.

(2) Second Embodiment

Figure 9:
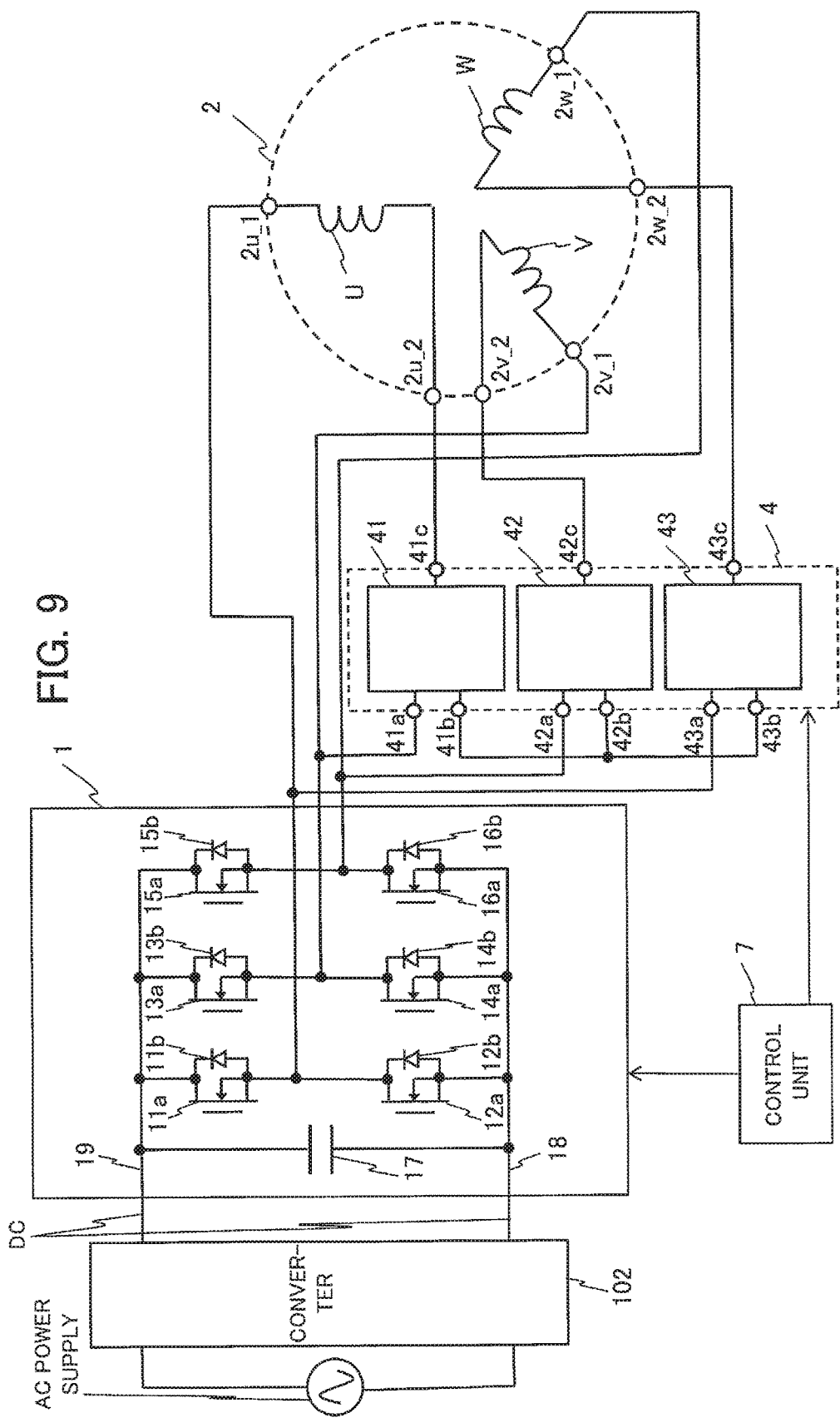
FIG. 9 is a diagram schematically showing a configuration of a motor driving device according to a second embodiment of the present invention.

FIG. 9 is a diagram schematically showing a configuration of a motor driving device according to a second embodiment of the present invention. In FIG. 9, each component identical or corresponding to a component shown in FIG. 1 is assigned the same reference character as in FIG. 1. The motor driving device according to the second embodiment differs from the motor driving device according to the first embodiment in the configuration of a connection switching unit 4 and a connection switching signal outputted from a control unit 7. Except these features, the motor driving device according to the second embodiment is the same as the motor driving device according to the first embodiment. Thus, the description of the second embodiment will be given mainly of the difference from the first embodiment.

As shown in FIG. 9, the motor driving device according to the second embodiment is a device that is connected to a converter 102 converting AC voltage supplied from an AC power supply into DC voltage and drives a motor 2 including stator windings of three phases.

The motor driving device according to the second embodiment includes the inverter 1, the connection switching unit 4 that switches the connection condition of the open winding U, the open winding V and the open winding W to either of the first connection condition and the second connection condition different from the first connection condition, and the control unit 7 that controls the inverter 1 and the connection switching unit 4. In the second embodiment, the first connection condition is the condition of the star connection in which the neutral points are connected together by the connection switching unit 4, and the second connection condition is the condition of the delta connection.

As shown in FIG. 9, the connection switching unit 4 includes circuits each including semiconductor switches (e.g., MOS transistors shown in FIG. 10 which will be explained later), namely, a switch circuit (first switch circuit) 41, a switch circuit (second switch circuit) 42 and a switch circuit (third switch circuit) 43.

The switch circuit 41 has a first terminal 41*a* connected to the V-phase output terminal of the inverter 1, a second terminal 41*b* connected to a fifth terminal 42*b* of the switch circuit 42 and an eighth terminal 43*b* of the switch circuit 43 which will be described later, and a third terminal 41*c* connected to the winding terminal (second winding terminal) 2*u*_2 of the open winding U and connected to one of the first terminal 41*a* and the second terminal 41*b*.

The switch circuit 42 has a fourth terminal 42*a* connected to the W-phase output terminal of the inverter 1, the fifth terminal 42*b* connected to the second terminal 41*b* of the switch circuit 41 and the eighth terminal 43*b* of the switch circuit 43, and a sixth terminal 42*c* connected to the winding terminal (fourth winding terminal) 2*v*_2 of the open winding V and connected to one of the fourth terminal 42*a* and the fifth terminal 42*b*.

The switch circuit 43 has a seventh terminal 43*a* connected to the U-phase output terminal of the inverter 1, the eighth terminal 43*b* connected to the second terminal 41*b* of the switch circuit 41 and the fifth terminal 42*b* of the switch circuit 42, and a ninth terminal 43*c* connected to the winding terminal (sixth winding terminal) 2*w*_2 of the open winding W and connected to one of the seventh terminal 43*a* and the eighth terminal 43*b*.

In the connection switching unit 4, the ON state (conduction between the source and the drain) or the OFF state (non-conduction between the source and the drain) of each semiconductor switch is controlled according to the connection switching signal outputted from the control unit 7 (e.g., gate control signal for each MOS transistor shown in FIG. 10 which will be explained later). The connection switching unit 4 switches the connection condition of the stator windings of the motor 2 to the star connection that is the first connection condition by connecting the second terminal 41*b* and the third terminal 41*c* together in the switch circuit 41, connecting the fifth terminal 42*b* and the sixth terminal 42*c* together in the switch circuit 42, and connecting the eighth terminal 43*b* and the ninth terminal 43*c* together in the switch circuit 43.

Further, the connection switching unit 4 switches the connection condition to the delta connection that is the second connection condition by connecting the first terminal 41*a* and the third terminal 41*c* together in the switch circuit 41, connecting the fourth terminal 42*a* and the sixth terminal 42*c* together in the switch circuit 42, and connecting the seventh terminal 43*a* and the ninth terminal 43*c* together in the switch circuit 43.

Figure 10:
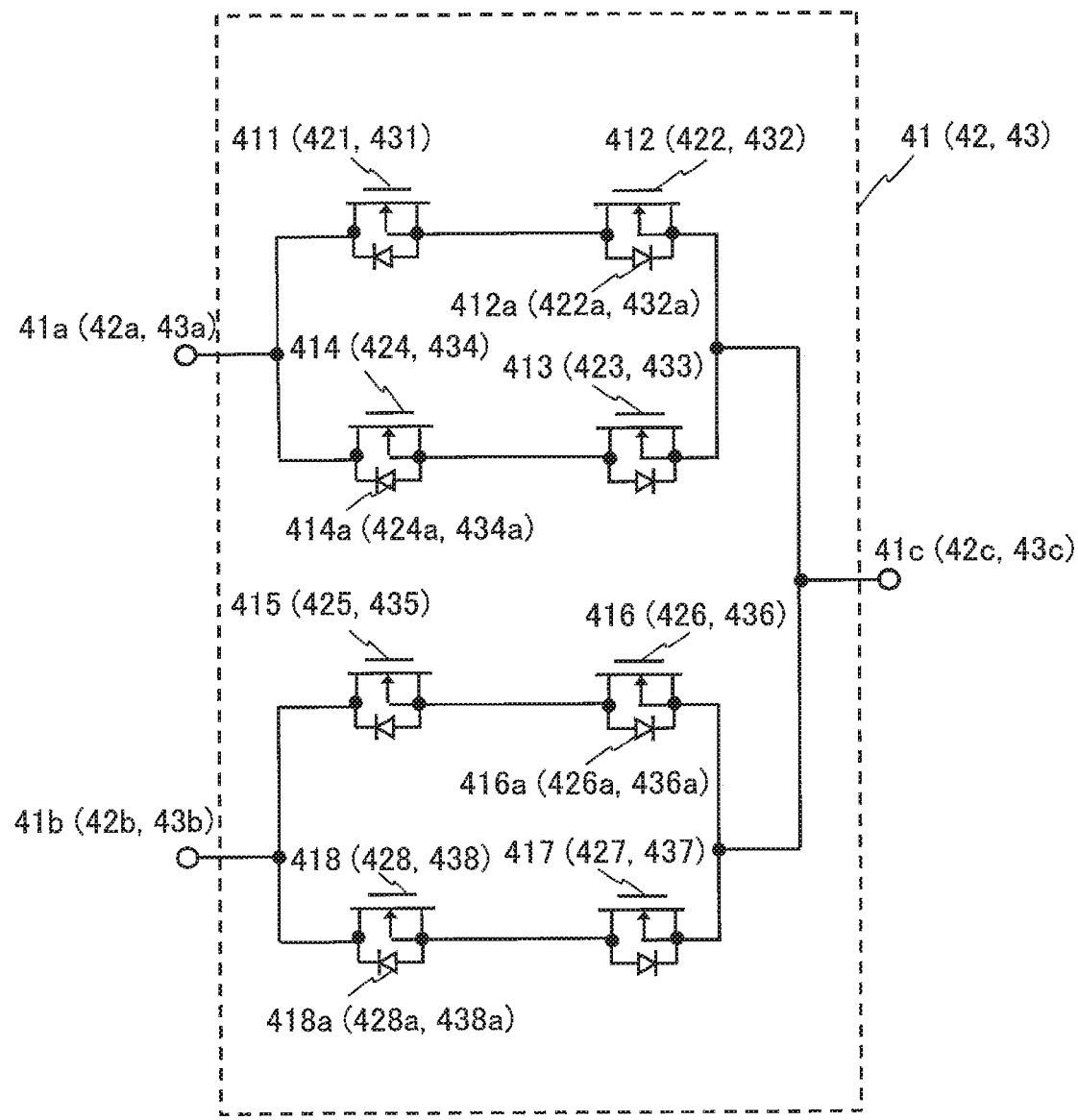
FIG. 10 is a circuit diagram showing a circuit including semiconductor switches in the motor driving device shown in FIG. 9.

FIG. 10 is a circuit diagram showing the switch circuits 41, 42 and 43 of the connection switching unit 4 in the motor driving device shown in FIG. 9. The switch circuits 41, 42 and 43 have the same configuration as each other, and thus the configuration of the switch circuit 41 will be described below as the representative.

As shown in FIG. 10, the switch circuit 41 includes a MOS transistor (first MOS transistor) 411 and a MOS transistor (second MOS transistor) 412 connected in series between the first terminal 41*a* and the third terminal 41*c*, and a MOS transistor (third MOS transistor) 413 and a MOS transistor (fourth MOS transistor) 414 connected in series between the first terminal 41*a* and the third terminal 41*c*.

The MOS transistor 411 includes a parasitic diode having an anode connected to the MOS transistor 412 and a cathode connected to the first terminal 41*a*, and current does not flow from the first terminal 41*a* towards the MOS transistor 412 unless the MOS transistor 411 shifts to the ON state. The MOS transistor 412 includes a parasitic diode 412*a* having an anode connected to the MOS transistor 411 and a cathode connected to the third terminal 41*c*, and is capable of conducting current in a direction heading from the MOS transistor 411 to the third terminal 41*c*.

The MOS transistor 413 includes a parasitic diode having an anode connected to the MOS transistor 414 and a cathode connected to the third terminal 41*c*, and current does not flow from the third terminal 41*c* towards the MOS transistor 414 unless the MOS transistor 413 shifts to the ON state. The MOS transistor 414 includes a parasitic diode 414*a* having an anode connected to the MOS transistor 413 and a cathode connected to the first terminal 41*a*, and is capable of conducting current in a direction heading from the MOS transistor 413 to the first terminal 41*a*.

The switch circuit 41 further includes a MOS transistor (fifth MOS transistor) 415 and a MOS transistor (sixth MOS transistor) 416 connected in series between the second terminal 41*b* and the third terminal 41*c*, and a MOS transistor (seventh MOS transistor) 417 and a MOS transistor (eighth MOS transistor) 418 connected in series between the second terminal 41*b* and the third terminal 41*c*.

The MOS transistor 415 includes a parasitic diode having an anode connected to the MOS transistor 416 and a cathode connected to the second terminal 41*b*, and current does not flow from the second terminal 41*b* towards the MOS transistor 416 unless the MOS transistor 415 shifts to the ON state. The MOS transistor 416 includes a parasitic diode 416a having an anode connected to the MOS transistor 415 and a cathode connected to the third terminal 41c, and is capable of conducting current in a direction heading from the MOS transistor 415 to the third terminal 41c.

The MOS transistor 417 includes a parasitic diode having an anode connected to the MOS transistor 418 and a cathode connected to the third terminal 41c, and current does not flow from the third terminal 41c towards the MOS transistor 418 unless the MOS transistor 417 shifts to the ON state. The MOS transistor 418 includes a parasitic diode 418a having an anode connected to the MOS transistor 417 and a cathode connected to the second terminal 41b, and is capable of conducting current in a direction heading from the MOS transistor 417 to the second terminal 41b.

As shown in FIG. 10, the switch circuits 41, 42 and 43 have the same configuration as each other and operate in the same way, and thus explanation of the configuration and operation of the switch circuits 42 and 43 is omitted. The explanation is omitted by replacing the number 41 in the reference character representing each component of the switch circuit 41 with 42 in regard to the switch circuit 42 and with 43 in regard to the switch circuit 43.

Namely, the configuration of the switch circuit 42 is the same as that obtained by respectively replacing the first terminal 41a, the second terminal 41b, the third terminal 41c, the MOS transistors 411 to 418, and the parasitic diodes 412a, 414a, 416a and 418a constituting the switch circuit 41 with the first terminal 42a, the second terminal 42b, the third terminal 42c, MOS transistors 421 to 428, and parasitic diodes 422a, 424a, 426a and 428a.

Further, the configuration of the switch circuit 43 is the same as that obtained by respectively replacing the first terminal 41a, the second terminal 41b, the third terminal 41c, the MOS transistors 411 to 418, and the parasitic diodes 412a, 414a, 416a and 418a constituting the switch circuit 41 with the first terminal 43a, the second terminal 43b, the third terminal 43c, MOS transistors 431 to 438, and parasitic diodes 432a, 434a, 436a and 438a.

FIG. 11 is a diagram showing an example of ON and OFF states of the MOS transistors 411 to 418, 421 to 428 and 431 to 438 as the semiconductor switches in the switch circuits 41, 42 and 43 shown in FIG. 9 in a tabular form. The switch circuits 41, 42 and 43 have the same configuration as each other and operate in the same way according to the connection switching signal (e.g., gate control signal for the MOS transistors) outputted from the control unit 7.

As shown in FIG. 11, the connection switching unit 4 is capable of switching the connection condition of the stator windings to the star connection that is the first connection condition by setting the MOS transistors (fifth, seventh, thirteenth, fifteenth, twenty-first and twenty-third MOS transistors) 415, 417, 425, 427, 435 and 437 in the ON state (conduction between the source and the drain) and setting the MOS transistors (first to fourth, sixth, eighth, ninth to twelfth, fourteenth, sixteenth, seventeenth to twentieth, twenty-second and twenty-fourth MOS transistors) 411 to 414, 416, 418, 421 to 424, 426, 428, 431 to 434, 436 and 438 in the OFF state (non-conduction between the source and the drain).

In this case, current heading from the second terminal 41b to the third terminal 41c flows from the second terminal 41b to the third terminal 41c through the MOS transistor 415 in the ON state and the diode 416a, and current heading from the third terminal 41c to the second terminal 41b flows from the third terminal 41c to the second terminal 41b through the MOS transistor 417 in the ON state and the diode 418a.

Similarly, current heading from the fifth terminal 42b to the sixth terminal 42c flows from the fifth terminal 42b to the sixth terminal 42c through the MOS transistor 425 in the ON state and the diode 426a, and current heading from the sixth terminal 42c to the fifth terminal 42b flows from the sixth terminal 42c to the fifth terminal 42b through the MOS transistor 427 in the ON state and the diode 428a.

Similarly, current heading from the eighth terminal 43b to the ninth terminal 43c flows from the eighth terminal 43b to the ninth terminal 43c through the MOS transistor 435 in the ON state and the diode 436a, and current heading from the ninth terminal 43c to the eighth terminal 43b flows from the ninth terminal 43c to the eighth terminal 43b through the MOS transistor 437 in the ON state and the diode 438a.

Further, as shown in FIG. 11, the connection switching unit 4 is capable of switching the connection condition of the stator windings to the delta connection that is the second connection condition by setting the MOS transistors (first, third, ninth, eleventh, seventeenth and nineteenth MOS transistors) 411, 413, 421, 423, 431 and 433 in the ON state (conduction between the source and the drain) and setting the MOS transistors (second, fourth to eighth, tenth, twelfth to sixteenth, eighteenth, and twentieth to twenty-fourth MOS transistors) 412, 414 to 418, 422, 424 to 428, 432, and 434 to 438 in the OFF state (non-conduction between the source and the drain).

In this case, current heading from the first terminal 41a to the third terminal 41c flows from the first terminal 41a to the third terminal 41c through the MOS transistor 411 in the ON state and the diode 412a, and current heading from the third terminal 41c to the first terminal 41a flows from the third terminal 41c to the first terminal 41a through the MOS transistor 413 in the ON state and the diode 414a.

Similarly, current heading from the fourth terminal 42a to the sixth terminal 42c flows from the fourth terminal 42a to the sixth terminal 42c through the MOS transistor 421 in the ON state and the diode 422a, and current heading from the sixth terminal 42c to the fourth terminal 42a flows from the sixth terminal 42c to the fourth terminal 42a through the MOS transistor 423 in the ON state and the diode 424a.

Similarly, current heading from the seventh terminal 43a to the ninth terminal 43c flows from the seventh terminal 43a to the ninth terminal 43c through the MOS transistor 431 in the ON state and the diode 432a, and current heading from the ninth terminal 43c to the seventh terminal 43a flows from the ninth terminal 43c to the seventh terminal 43a through the MOS transistor 433 in the ON state and the diode 434a.

FIG. 12 is a diagram showing another example of ON and OFF states of the MOS transistors as the semiconductor switches in the switch circuits 41, 42 and 43 shown in FIG. 9 in a tabular form. The switch circuits 41, 42 and 43 have the same configuration as each other and operate in the same way according to the connection switching signal (e.g., gate control signal for the MOS transistors) outputted from the control unit 7.

As shown in FIG. 12, the connection switching unit 4 is capable of switching the connection condition of the stator windings to the star connection that is the first connection condition by setting the MOS transistors (fifth, seventh, thirteenth, fifteenth, twenty-first and twenty-third MOS transistors) 415, 417, 425, 427, 435 and 437 in the ON state (conduction between the source and the drain) and setting the MOS transistors (first, third, ninth, eleventh, seventeenth and nineteenth MOS transistors) 411, 413, 421, 423, 431 and 433 in the OFF state (non-conduction between the source and the drain).

In this case, current heading from the second terminal 41*b* to the third terminal 41*c* flows from the second terminal 41*b* to the third terminal 41*c* through the MOS transistor 415 in the ON state and the diode 416*a* (or the diode 416*a* and the MOS transistor 416 in the ON state), and current heading from the third terminal 41*c* to the second terminal 41*b* flows from the third terminal 41*c* to the second terminal 41*b* through the MOS transistor 417 in the ON state and the diode 418*a* (or the diode 418*a* and the MOS transistor 418 in the ON state).

Similarly, current heading from the fifth terminal 42*b* to the sixth terminal 42*c* flows from the fifth terminal 42*b* to the sixth terminal 42*c* through the MOS transistor 425 in the ON state and the diode 426*a* (or the diode 426*a* and the MOS transistor 426 in the ON state), and current heading from the sixth terminal 42*c* to the fifth terminal 42*b* flows from the sixth terminal 42*c* to the fifth terminal 42*b* through the MOS transistor 427 in the ON state and the diode 428*a* (or the diode 428*a* and the MOS transistor 428 in the ON state).

Similarly, current heading from the eighth terminal 43*b* to the ninth terminal 43*c* flows from the eighth terminal 43*b* to the ninth terminal 43*c* through the MOS transistor 435 in the ON state and the diode 436*a* (or the diode 436*a* and the MOS transistor 436 in the ON state), and current heading from the ninth terminal 43*c* to the eighth terminal 43*b* flows from the ninth terminal 43*c* to the eighth terminal 43*b* through the MOS transistor 437 in the ON state and the diode 438*a* (or the diode 438*a* and the MOS transistor 438 in the ON state).

Further, as shown in FIG. 12, the connection switching unit 4 is capable of switching the connection condition of the stator windings to the delta connection that is the second connection condition by setting the MOS transistors (first, third, ninth, eleventh, seventeenth and nineteenth MOS transistors) 411, 413, 421, 423, 431 and 433 in the ON state (conduction between the source and the drain) and setting the MOS transistors (fifth, seventh, thirteenth, fifteenth, twenty-firth and twenty-third MOS transistors) 415, 417, 425, 427, 435 and 437 in the OFF state (non-conduction between the source and the drain).

In this case, current heading from the first terminal 41*a* to the third terminal 41*c* flows from the first terminal 41*a* to the third terminal 41*c* through the MOS transistor 411 in the ON state and the diode 412*a* (or the diode 412*a* and the MOS transistor 412 in the ON state), and current heading from the third terminal 41*c* to the first terminal 41*a* flows from the third terminal 41*c* to the first terminal 41*a* through the MOS transistor 413 in the ON state and the diode 414*a* (or the diode 414*a* and the MOS transistor 414 in the ON state).

Similarly, current heading from the fourth terminal 42*a* to the sixth terminal 42*c* flows from the fourth terminal 42*a* to the sixth terminal 42*c* through the MOS transistor 421 in the ON state and the diode 422*a* (or the diode 422*a* and the MOS transistor 422 in the ON state), and current heading from the sixth terminal 42*c* to the fourth terminal 42*a* flows from the sixth terminal 42*c* to the fourth terminal 42*a* through the MOS transistor 423 in the ON state and the diode 424*a* (or the diode 424*a* and the MOS transistor 424 in the ON state).

Similarly, current heading from the seventh terminal 43*a* to the ninth terminal 43*c* flows from the seventh terminal 43*a* to the ninth terminal 43*c* through the MOS transistor 431 in the ON state and the diode 432*a* (or the diode 432*a* and the MOS transistor 432 in the ON state), and current heading from the ninth terminal 43*c* to the seventh terminal 43*a* flows from the ninth terminal 43*c* to the seventh terminal 43*a* through the MOS transistor 433 in the ON state and the diode 434*a* (or the diode 434*a* and the MOS transistor 434 in the ON state).

For the same reason as in the first embodiment, the switching time necessary for the switching of the MOS transistors (first to twenty-fourth MOS transistors) 411 to 417, 421 to 427 and 431 to 437 as the semiconductor switches of the connection switching unit 4 between the ON state and the OFF state is desired to be within 1 ms.

The switching time of MOS transistors as semiconductor switches is generally less than 10 μs. Thus, by setting the switching time of the semiconductor switches within 1 ms, the connection condition can be switched without stopping the operation of the compressor driven by the motor 2 and the operating efficiency can be maintained. However, it is also possible to make the switching of the semiconductor switches of the connection switching unit 4 in the operation stoppage (interruption) period of the motor 2 for the compressor.

Further, for the same reason as in the first embodiment, the MOS transistors (first to twenty-fourth MOS transistors) 411 to 417, 421 to 427 and 431 to 437 as the semiconductor switches are desired to be WBG semiconductors. The WBG semiconductor is, for example, a semiconductor containing SiC or GaN as a constituent material. In a case where WBG semiconductors are used as the semiconductor switches, the switching time can be shortened to approximately 10 ns or less, and thus the connection switching can be made in the dead time period of the inverter 1.

Similarly to the first embodiment, it is desirable to set the switching time of the semiconductor switches of the connection switching unit 4 at less than 10 μs and make the switching of the semiconductor switches of the connection switching unit 4 in the dead time period of the switches of the inverter 1.

As described above, with the motor driving device according to the second embodiment, the connection condition of the stator windings can be switched appropriately by the switching of the MOS transistors as the semiconductor switches included in the connection switching unit 4 between the ON state and the OFF state, and thus the motor 2 can be driven in high speed rotation, and the motor 2 can be driven with high efficiency in low speed rotation.

Figure 13:
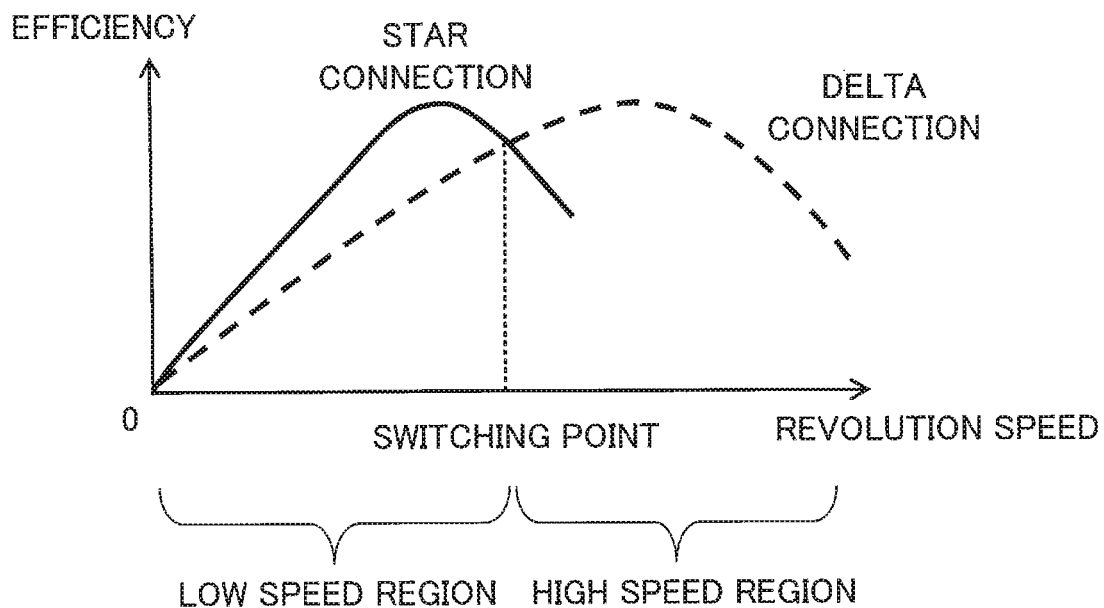
FIG. 13 is a graph showing the relationship between revolution speed of the motor and efficiency of the motor in a case where connection condition is the star connection and the delta connection.

FIG. 13 is a graph showing the relationship between the revolution speed of the motor 2 and the efficiency of the motor 2 in a case where the connection condition is the star connection and the delta connection. The horizontal axis of FIG. 13 represents the revolution speed of the motor 2 and the vertical axis of FIG. 13 represents the efficiency of the motor 2 (ratio of mechanical output power to input electric power). As shown in FIG. 13, the efficiency of the motor 2 in the case where the connection condition is the star connection is excellent in a low speed (low load) region in which the revolution speed of the motor 2 is low, but drops in a high speed (overload) region in which the revolution speed of the motor 2 is high. The efficiency of the motor 2 in the case where the connection condition is the delta connection is inferior to that in the case of the star connection in the low speed (low load) region, but increases in the high speed (overload) region. Thus, the star connection excels in the efficiency in the low speed (low load) region, while the delta connection excels in the efficiency in the high speed (overload) region. Accordingly, it is desirable to make the switching to a connection condition of higher efficiency at the switching point shown in FIG. 13.

Further, with the motor driving device according to the second embodiment, the operation of the motor 2 does not necessarily have to be stopped (interrupted) for the switching of the connection condition, and thus the motor 2 can be driven with high efficiency. Especially when MOS transistors of a short switching time are used as the semiconductor switches for the connection switching unit 4 of the motor driving device, even switching the connection condition in the middle of the operation of the motor has little influence on the motor driving device, and the system (e.g., air conditioner) including the motor driving device can be operated normally.

Furthermore, in a case where WBG transistors of a short switching time are used as the semiconductor switches for the connection switching unit 4 in the motor driving device according to the second embodiment, the switching of the connection condition can be completed in the dead time period of the inverter 1, and thus the switching of the connection condition in the middle of the operation of the motor 2 can be carried out with no influence on the system (e.g., air conditioner) including the motor driving device.

(3) Third Embodiment

Figure 14:
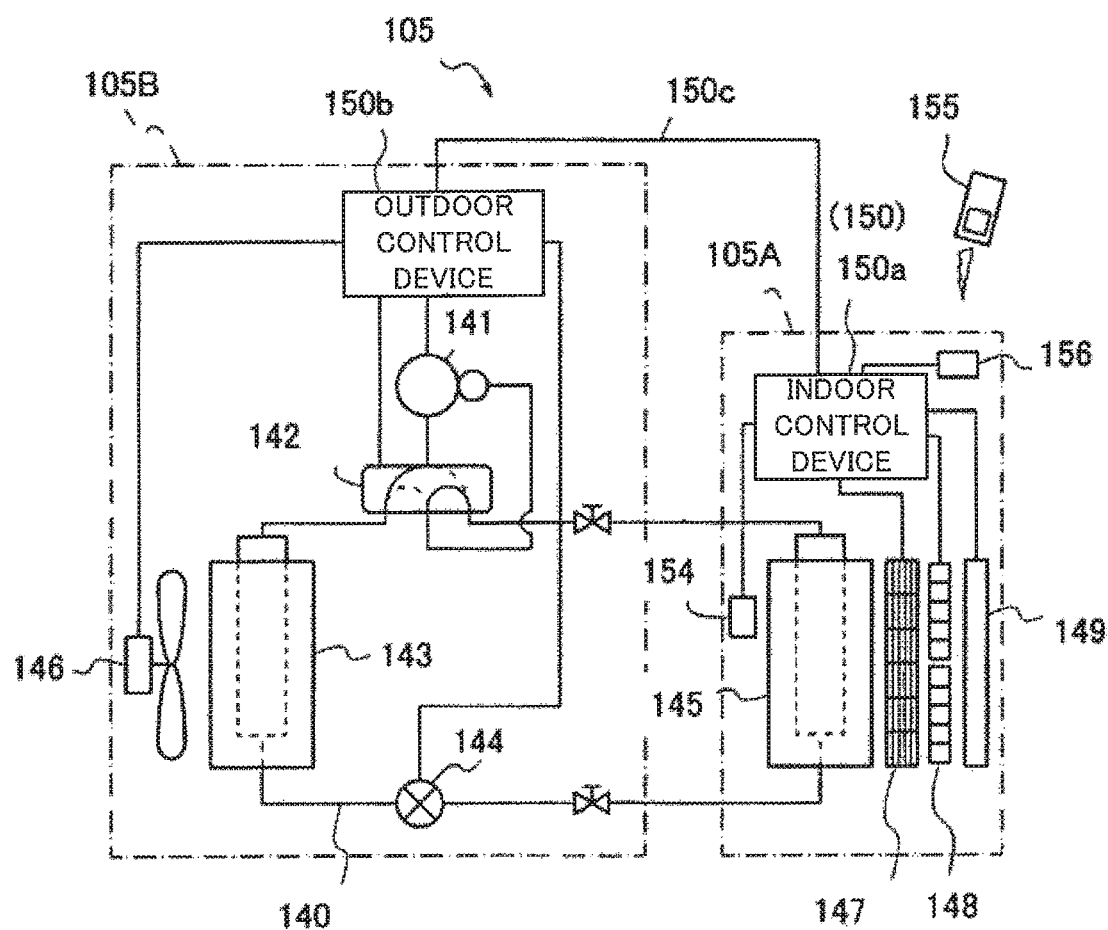
FIG. 14 is a block diagram showing a configuration of an air conditioner according to a third embodiment of the present invention.

An air conditioner including the motor driving device according to the first or second embodiment will be described below. FIG. 14 is a block diagram showing a configuration of an air conditioner 105 according to a third embodiment of the present invention. The air conditioner 105 includes an indoor unit 105A that is installed in a room (in a cooling/heating object space) and an outdoor unit 105B that is installed outdoors. The indoor unit 105A and the outdoor unit 105B are connected together by connection piping 140 in which a refrigerant flows.

The outdoor unit 105B includes a compressor 141 that compresses the refrigerant and discharges the compressed refrigerant, a four-way valve (refrigerant channel selector valve) 142 that switches the flow direction of the refrigerant, an outdoor heat exchanger 143 that performs heat exchange between outside air and the refrigerant, and an expansion valve (decompression device) 144 that decompresses the high-pressure refrigerant into low pressure. The compressor 141 is formed with a rotary compressor, for example. The indoor unit 105A includes an indoor heat exchanger 145 that performs heat exchange between indoor air and the refrigerant.

The compressor 141, the four-way valve 142, the outdoor heat exchanger 143, the expansion valve 144 and the indoor heat exchanger 145 are connected together by the piping 140 to form a refrigerant circuit. With these components, a compression refrigeration cycle (compression heat pump cycle) circulating the refrigerant with the compressor 141 is formed.

To control the operation of the air conditioner 105, an indoor control device 150*a* is arranged in the indoor unit 105A and an outdoor control device 150*b* is arranged in the outdoor unit 105B. Each of the indoor control device 150*a* and the outdoor control device 150*b* includes a control board on which various circuits for controlling the air conditioner 105 have been formed. The indoor control device 150*a* and the outdoor control device 150*b* are connected to each other by a communication cable 150*c*.

In the outdoor unit 105B, an outdoor blower fan 146 as a blower is arranged to face the outdoor heat exchanger 143. The outdoor blower fan 146 rotates and thereby generates an air flow passing through the outdoor heat exchanger 143. The outdoor blower fan 146 is formed with a propeller fan, for example. The outdoor heat exchanger 143 is arranged in the air blow direction (direction of the air flow) of the outdoor blower fan 146.

The four-way valve 142 is controlled by the outdoor control device 150*b* and switches the direction in which the refrigerant flows. When the four-way valve 142 is at the position indicated by the solid line in FIG. 14, the gas refrigerant discharged from the compressor 141 is sent to the outdoor heat exchanger 143. In contrast, when the four-way valve 142 is at the position indicated by the broken line in FIG. 14, the gas refrigerant discharged from the compressor 141 is sent to the indoor heat exchanger 145. The expansion valve 144 is controlled by the outdoor control device 150*b* and decompresses the high-pressure refrigerant into low pressure by changing its opening degree.

In the indoor unit 105A, an indoor blower fan 147 as a blower is arranged to face the indoor heat exchanger 145. The indoor blower fan 147 rotates and thereby generates an air flow passing through the indoor heat exchanger 145. The indoor blower fan 147 is formed with a cross flow fan, for example. The indoor blower fan 147 is arranged on the downstream side of the indoor heat exchanger 145 in its air blow direction.

The indoor unit 105A is provided with an indoor temperature sensor 154 as a temperature sensor that measures an indoor temperature Ta as an air temperature in the room (a temperature of the cooling/heating object) and sends temperature information (information signal) obtained by the measurement to the indoor control device 150*a*. The indoor temperature sensor 154 may be formed with a temperature sensor used for standard air conditioners, or it is also possible to use a radiation temperature sensor that detects a surface temperature of a wall, floor or the like in the room.

The indoor unit 105A is further provided with a signal reception unit 156 that receives a command signal transmitted from a user operation unit operated by the user such as a remote control 155. With the remote control 155, the user makes operation inputs (operation start and stoppage) or issues commands in regard to the operation (a set temperature, a wind speed, etc.) to the air conditioner 105.

The compressor 141 is driven by the motor 2 described in the first or second embodiment. The motor 2 is generally formed integrally with a compression mechanism of the compressor 141. The compressor 141 is configured to be able to vary the operating revolution speed in a range of 20 rps to 120 rps in normal operation. With the increase in the revolution speed of the compressor 141, refrigerant circulation volume of the refrigerant circuit increases. The revolution speed of the compressor 141 is controlled by the outdoor control device 150*b* based on a temperature difference $\Delta T$ between the present indoor temperature Ta obtained by the indoor temperature sensor 154 and the set temperature Ts set by the user through the remote control 155. With the increase in the temperature difference $\Delta T$, the compressor 141 rotates at higher speed and increases the circulation volume of the refrigerant.

The rotation of the indoor blower fan 147 is controlled by the indoor control device 150*a*. The revolution speed of the indoor blower fan 147 can be switched in multiple steps (e.g., three steps of "high", "middle" and "low"). When the wind speed setting has been set at an automatic mode by using the remote control 155, the revolution speed of the indoor blower fan 147 is switched based on the temperature difference $\Delta T$ between the measured indoor temperature Ta and the set temperature Ts.

The rotation of the outdoor blower fan 146 is controlled by the outdoor control device 150*b*. The revolution speed of the outdoor blower fan 146 can be switched in multiple steps. For example, the revolution speed of the outdoor blower fan 146 is switched based on the temperature difference $\Delta T$ between the measured indoor temperature Ta and the set temperature Ts. The indoor unit 105A further includes a horizontal wind direction plate 148 and a vertical wind direction plate 149.

The basic operation of the air conditioner 105 is as follows: In the cooling operation, the four-way valve 142 is switched to the position indicated by the solid line and the high-temperature and high-pressure gas refrigerant discharged from the compressor 141 flows into the outdoor heat exchanger 143. In this case, the outdoor heat exchanger 143 operates as a condenser. When air passes through the outdoor heat exchanger 143 due to the rotation of the outdoor blower fan 146, the air absorbs condensation heat of the refrigerant by means of heat exchange. The refrigerant is condensed into a high-pressure and low-temperature liquid refrigerant and then adiabatically expanded by the expansion valve 144 into a low-pressure and low-temperature two-phase refrigerant.

The refrigerant that passed through the expansion valve 144 flows into the indoor heat exchanger 145 of the indoor unit 105A. The indoor heat exchanger 145 operates as an evaporator. When air passes through the indoor heat exchanger 145 due to the rotation of the indoor blower fan 147, the refrigerant absorbs evaporation heat and evaporates by means of heat exchange, and the air cooled down by the heat exchange is supplied to the inside of the room. The refrigerant evaporates into a low-temperature and low-pressure gas refrigerant and then compressed again by the compressor 141 into the high-temperature and high-pressure refrigerant.

In the heating operation, the four-way valve 142 is switched to the position indicated by the dotted line and the high-temperature and high-pressure gas refrigerant discharged from the compressor 141 flows into the indoor heat exchanger 145. In this case, the indoor heat exchanger 145 operates as a condenser. When air passes through the indoor heat exchanger 145 due to the rotation of the indoor blower fan 147, the air absorbs condensation heat of the refrigerant by means of heat exchange. By this operation, the heated air is supplied to the inside of the room. The refrigerant is condensed into a high-pressure and low-temperature liquid refrigerant and then adiabatically expanded by the expansion valve 144 into a low-pressure and low-temperature two-phase refrigerant.

The refrigerant that passed through the expansion valve 144 flows into the outdoor heat exchanger 143 of the outdoor unit 105B. The outdoor heat exchanger 143 operates as an evaporator. When air passes through the outdoor heat exchanger 143 due to the rotation of the outdoor blower fan 146, the refrigerant absorbs evaporation heat and evaporates by means of heat exchange. The refrigerant evaporates into a low-temperature and low-pressure gas refrigerant and then compressed again by the compressor 141 into the high-temperature and high-pressure refrigerant.

The indoor control device 150a and the outdoor control device 150b control the air conditioner 105 while exchanging information with each other via the communication cable 150c. The indoor control device 150a and the outdoor control device 150b will hereinafter be referred to collectively as a control device 150. The control device 150 corresponds to the control units 6 and 7 in the first and second embodiments.

Figure 15:
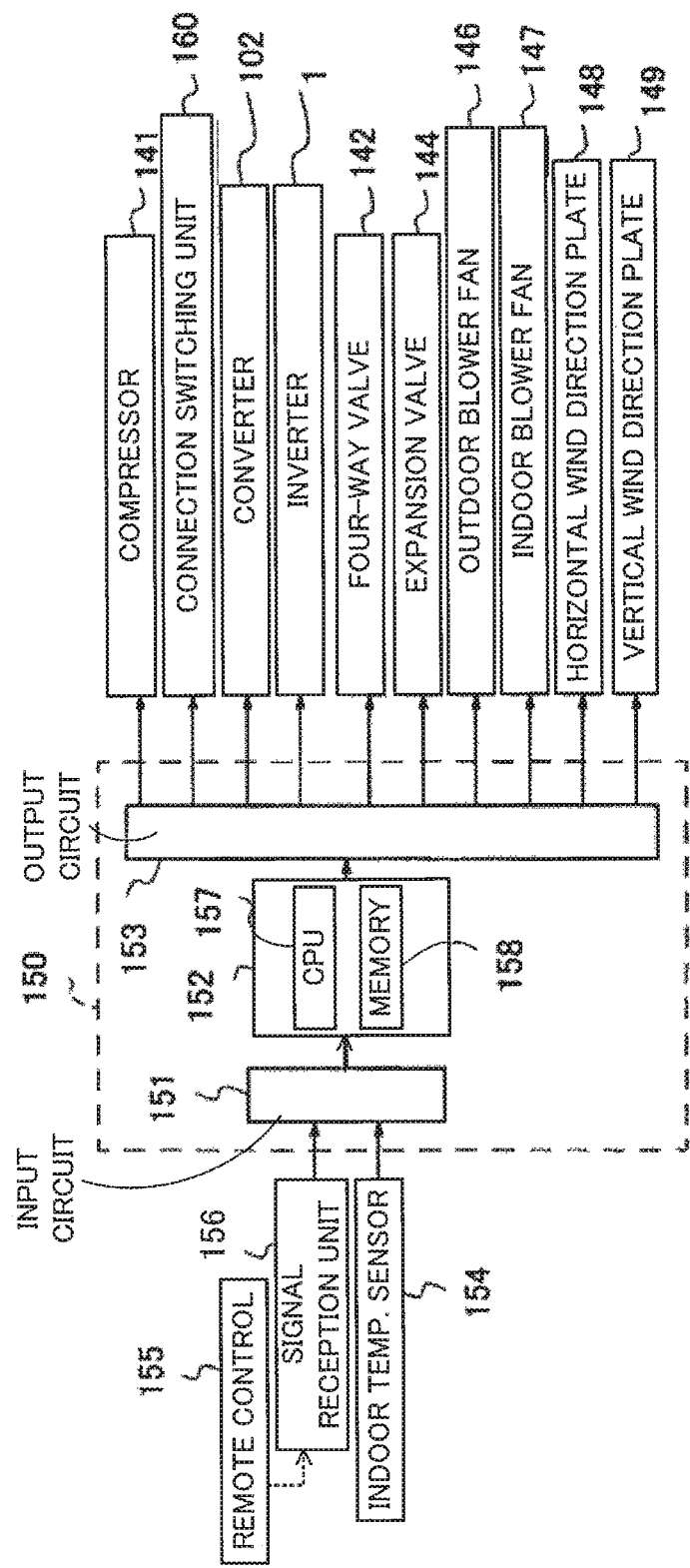
FIG. 15 is a block diagram showing a control system of the air conditioner according to the third embodiment.

FIG. 15 is a block diagram showing a control system of the air conditioner 105. The control device 150 is formed with a microcomputer, for example. An input circuit 151, an arithmetic circuit 152 and an output circuit 153 have been installed in the control device 150.

To the input circuit 151, the command signal received by the signal reception unit 156 from the remote control 155 is inputted. The command signal includes a signal for setting an operation input, an operation mode, the set temperature, an air flow rate or a wind direction, for example. The temperature information indicating the indoor temperature detected by the indoor temperature sensor 154 is also inputted to the input circuit 151. The input circuit 151 outputs these pieces of input information to the arithmetic circuit 152.

The arithmetic circuit 152 includes a CPU (Central Processing Unit) 157 and a memory 158. The CPU 157 performs arithmetic processing and judgment processing. The memory 158 stores various types of set values and programs to be used for the control of the air conditioner 105. The arithmetic circuit 152 performs computation and judgment based on the information inputted from the input circuit 151 and outputs a result thereof to the output circuit 153.

The output circuit 153 outputs control signals to the compressor 141, a connection switching unit 160, the converter 102, the inverter 1, the four-way valve 142, the expansion valve 144, the outdoor blower fan 146, the indoor blower fan 147, the horizontal wind direction plate 148 and the vertical wind direction plate 149 based on the information inputted from the arithmetic circuit 152. The connection switching unit 160 is the connection switching unit 3 in the first embodiment or the connection switching unit 4 in the second embodiment.

The control device 150 controls various types of devices in the indoor unit 105A and the outdoor unit 105B. Actually, each of the indoor control device 150a and the outdoor control device 150b is formed with a microcomputer. Incidentally, it is also possible to install the control device in only one of the indoor unit 105A and the outdoor unit 105B to control the various types of devices in the indoor unit 105A and the outdoor unit 105B.

The arithmetic circuit 152 analyzes the command signal inputted from the remote control 155 via the input circuit 151 and figures out, for example, the operation mode and the temperature difference $\Delta T$ between the set temperature Ts and the indoor temperature Ta based on a result of the analysis. When the operation mode is the cooling operation, the temperature difference $\Delta T$ is calculated as $\Delta T=Ta-Ts$. When the operation mode is the heating operation, the temperature difference $\Delta T$ is calculated as $\Delta T=Ts-Ta$.

The arithmetic circuit 152 controls the driving device 100 based on the temperature difference $\Delta T$ and thereby controls the revolution speed of the motor 2 (namely, the revolution speed of the compressor 141).

The basic operation of the air conditioner 105 is as described above. Next, the operation of the air conditioner will be described below. When the operation is started, the control device 150 starts up in the delta connection that is the connection at the end of the previous operation. The control device 150 drives fan motors of the indoor blower fan 147 and the outdoor blower fan 146 as a startup process of the air conditioner 105.

Subsequently, the control device 150 outputs a voltage switching signal to the converter 102 supplying the DC voltage (bus voltage) to the inverter 1 and thereby raises the bus voltage of the converter 102 to a bus voltage corresponding to the delta connection (e.g., 390 V). Further, the control device 150 starts up the motor 2.

Subsequently, the control device 150 performs the driving of the motor 2 in the delta connection. Specifically, the control device 150 controls the output voltage of the inverter 1 and thereby controls the revolution speed of the motor 2.

Further, the control device 150 acquires the temperature difference ΔT between the indoor temperature detected by the indoor temperature sensor 154 and the set temperature set through the remote control 155 and raises the revolution speed depending on the temperature difference ΔT up to an allowable maximum revolution speed at the maximum (130 rps in this example). By this operation, the refrigerant circulation volume of the compressor 141 is increased, the cooling capacity is raised in the case of the cooling operation, and the heating capacity is raised in the case of the heating operation.

When the indoor temperature approaches the set temperature due to the air conditioning effect and the temperature difference ΔT shows a tendency to decrease, the control device 150 decreases the revolution speed of the motor 2 depending on the temperature difference ΔT. When the temperature difference ΔT decreases to a predetermined near-zero temperature (greater than 0), the control device 150 operates the motor 2 at an allowable minimum revolution speed (20 rps in this example).

When the indoor temperature reaches the set temperature (namely, when the temperature difference ΔT decreases to 0 or less), the control device 150 stops the rotation of the motor 2 to avoid excessive cooling (or excessive heating). Accordingly, the compressor 141 shifts to the stopped state. Thereafter, when the temperature difference ΔT is greater than 0 again, the control device 150 restarts the rotation of the motor 2.

Further, the control device 150 judges whether the switching of the stator windings from the delta connection to the star connection is necessary or not. Specifically, the control device 150 judges whether or not the connection condition of the stator windings is the delta connection and the aforementioned temperature difference ΔT is less than or equal to a threshold value ΔTr. The threshold value ΔTr is a temperature difference corresponding to an air conditioning load that is low to the extent that the switching to the star connection is possible.

The switching from the delta connection to the star connection is made depending on a result of the comparison. If the connection condition of the stator windings is the delta connection and the temperature difference ΔT is less than or equal to the threshold value ΔTr, the control device 150 outputs a stop signal to the inverter 1 and thereby stops the rotation of the motor 2. Thereafter, the control device 150 outputs a connection switching signal to the connection switching unit 160 and thereby switches the connection condition of the stator windings from the delta connection to the star connection. Subsequently, the control device 150 outputs a voltage switching signal to the converter 102, thereby lowers the bus voltage of the converter 102 to a voltage corresponding to the star connection (e.g., 280 V), and restarts the rotation of the motor 2.

In the operation in the star connection, when the temperature difference ΔT is greater than the threshold value ΔTr, the control device 150 stops the rotation of the motor 2. Thereafter, the control device 150 outputs a connection switching signal to the connection switching unit 160 and thereby switches the connection condition of the stator windings from the star connection to the delta connection. Subsequently, the control device 150 outputs a voltage switching signal to the converter 102, thereby raises the bus voltage of the converter 102 to the voltage corresponding to the delta connection (e.g., 390 V), and restarts the rotation of the motor 2.

With the delta connection, the motor 2 can be driven to higher revolution speed compared with the star connection and that makes it possible to deal with higher loads. Accordingly, the temperature difference ΔT between the indoor temperature and the set temperature can be converged in a short time.

The control device 150 stops the rotation of the motor 2 when an operation stop signal is received. Thereafter, the control device 150 switches the connection condition of the stator windings from the star connection to the delta connection. Incidentally, when the connection condition of the stator windings is already the delta connection, the connection condition is maintained.

Thereafter, the control device 150 performs a stoppage process of the air conditioner 105. Specifically, the control device 150 stops the fan motors of the indoor blower fan 147 and the outdoor blower fan 146. Thereafter, the CPU 157 of the control device 150 stops and the operation of the air conditioner 105 ends.

As above, the motor 2 is operated in the star connection of high efficiency when the temperature difference ΔT between the indoor temperature and the set temperature is relatively small (namely, less than or equal to the threshold value ΔTr). When it is necessary to deal with a higher load, namely, when the temperature difference ΔT is greater than the threshold value ΔTr, the motor 2 is operated in the delta connection capable of dealing with higher loads. Accordingly, operating efficiency of the air conditioner 105 can be increased.

Incidentally, when switching from the star connection to the delta connection, it is also possible to detect the revolution speed of the motor 2 before stopping the rotation of the motor 2 and make a judgment on whether or not the detected revolution speed is higher than or equal to a threshold value. As the threshold value for the revolution speed of the motor 2, rps as the midpoint between a revolution speed 35 rps corresponding to a heating intermediate condition and a revolution speed 85 rps corresponding to a heating rated condition is used, for example. If the revolution speed of the motor 2 is higher than or equal to the threshold value, the rotation of the motor 2 is stopped, the switching to the delta connection is made, and the bus voltage of the converter 102 is raised.

By making the connection switching necessity judgment based on the revolution speed of the motor 2 as above in addition to the connection switching necessity judgment based on the temperature difference ΔT, more reliable connection switching can be carried out.

Figure 16:
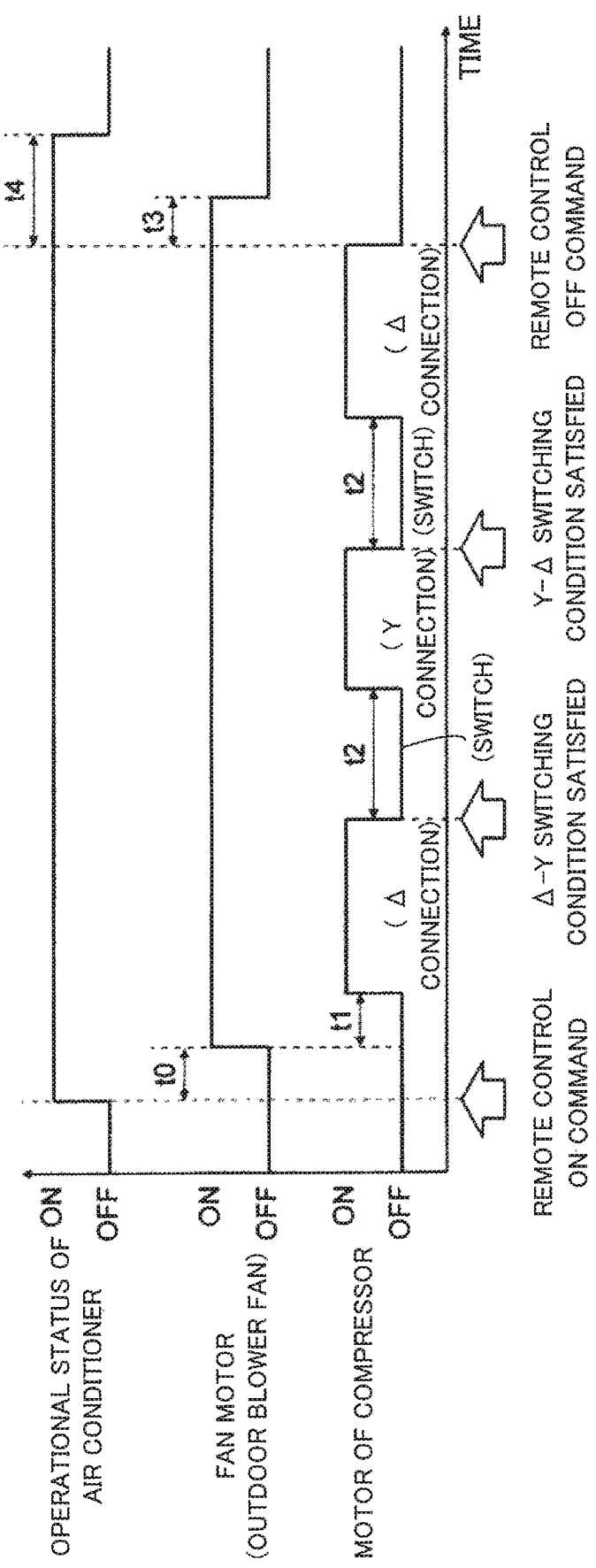
FIG. 16 is a timing chart showing an example of operation of the air conditioner according to the third embodiment.

FIG. 16 is a timing chart showing an example of the operation of the air conditioner 105. FIG. 16 shows operational status of the air conditioner 105 and drive status of the outdoor blower fan 146 and the motor 2 (compressor 141). The outdoor blower fan 146 is shown as an example of a component of the air conditioner 105 other than the motor 2.

In response to an operation startup signal (ON command) received by the signal reception unit 156 from the remote control 155, the CPU 157 starts up and the air conditioner 105 shifts to a startup state (ON state). When the air conditioner 105 shifts to the startup state, the fan motor of the outdoor blower fan 146 starts rotating after the elapse of a time t0. The time t0 is a delay time due to the communication between the indoor unit 105A and the outdoor unit 105B.

Thereafter, the rotation of the motor 2 with the delta connection is started after the elapse of a time t1. The time t1 is a waiting time until the rotation of the fan motor of the outdoor blower fan 146 stabilizes. By rotating the outdoor blower fan 146 before starting the rotation of the motor 2, an excessive rise in the temperature of the refrigeration cycle is prevented.

In the example of FIG. 16, the switching from the delta connection to the star connection is made, the switching from the star connection to the delta connection is also made, and the operation stop signal (OFF command) is received from the remote control 155. The time t2 necessary for the connection switching, as a waiting time necessary for the restart of the motor 2, is set at a time necessary for the refrigerant pressure in the refrigeration cycle to become approximately uniform.

Upon receiving the operation stop signal from the remote control 155, the rotation of the motor 2 stops, and the rotation of the fan motor of the outdoor blower fan 146 stops after the elapse of a time t3. The time t3 is a waiting time necessary for sufficiently lowering the temperature of the refrigeration cycle. After the elapse of a time t4, the CPU 157 stops and the air conditioner 105 shifts to an operation stop state (OFF state). The time t4 is a previously set waiting time.

In the air conditioner 105 according to the third embodiment, the connection switching unit 3 or 4 of the motor driving device in the first or second embodiment can be used as the connection switching unit 160. Therefore, the connection condition of the stator windings can be switched appropriately by the switching of the MOS transistors as the semiconductor switches between the ON state and the OFF state. Accordingly, the motor 2 can be driven in high speed rotation, and the motor 2 can be driven with high efficiency in low speed rotation.

Further, in the air conditioner 105 according to the third embodiment, the operation of the motor 2 does not necessarily have to be stopped (interrupted) for the switching of the connection condition. Thus, the motor 2 can be driven with still higher efficiency. Especially when MOS transistors of a short switching time are used as the semiconductor switches for the connection switching unit 4 of the motor driving device, even switching the connection condition in the middle of the operation of the motor has little influence on the motor driving device, and the system (e.g., air conditioner) including the motor driving device can be operated normally.

Furthermore, in a case where WBG transistors of a short switching time are used as the semiconductor switches for the connection switching unit 4 in the air conditioner 105 according to the third embodiment, the switching of the connection condition can be completed in the dead time period of the inverter 1, and thus the switching of the connection condition in the middle of the operation of the motor 2 can be carried out with no influence on the air conditioner.

Incidentally, the air conditioning operation and the conditions for the switching of the connection condition described above are just an example; the conditions for the switching between the star connection and the delta connection may be determined based on various conditions such as the motor revolution speed, the motor current and a modulation factor or a combination of various conditions, for example.

What is claimed is:

1. A motor driving device for driving a motor including stator windings, comprising:
   a connection switching unit that includes a circuit including a semiconductor switch and switches connection condition of the stator windings to either of first connection condition and second connection condition different from the first connection condition by setting the semiconductor switch to ON or OFF; and
   an inverter that supplies AC drive currents to the stator windings,
   the motor driving device performing switching of the semiconductor switch between an ON state and an OFF state in a dead time period when the inverter does not supply the AC drive currents to the stator windings,
   wherein
   the stator windings include a first open winding and a second open winding,
   the first open winding has a first winding terminal connected to the inverter and a second winding terminal connected to the connection switching unit,
   the second open winding has a third winding terminal connected to the inverter and a fourth winding terminal connected to the connection switching unit,
   the connection switching unit switches the connection condition of the stator windings to the first connection condition by connecting the second winding terminal of the first open winding and the fourth winding terminal of the second open winding together via the semiconductor switch, and
   the connection switching unit switches the connection condition of the stator windings to the second connection condition by connecting the second winding terminal of the first open winding and the fourth winding terminal of the second open winding to the inverter via the semiconductor switch.

2. The motor driving device according to claim 1, wherein a switching time of the semiconductor switch between an ON state and an OFF state is less than 10 μs.

3. The motor driving device according to claim 1, wherein the semiconductor switch is a wide band gap semiconductor switch.

4. The motor driving device according to claim 3, wherein the wide band gap semiconductor contains silicon carbide or gallium nitride as a constituent material.

5. The motor driving device according to claim 1, further comprising a control unit that controls the connection switching unit and the inverter,
   the motor driving device making the connection switching unit perform the switching of the connection condition in a driving period of the motor or in an interruption period of the driving.

6. A motor driving device for driving a motor including stator windings, comprising:
   a connection switching unit that includes a circuit including a semiconductor switch and switches connection condition of the stator windings to either of first connection condition and second connection condition different from the first connection condition by setting the semiconductor switch to ON or OFF; and
   an inverter that supplies AC drive currents to the stator windings,
   the motor driving device performing switching of the semiconductor switch between an ON state and an OFF state in a dead time period when the inverter does not supply the AC drive currents to the stator windings,
   wherein
   the stator windings include a first open winding and a second open winding,
   the first open winding has a first winding terminal connected to the inverter and a second winding terminal connected to the connection switching unit, the second open winding has a third winding terminal connected to the inverter and a fourth winding terminal connected to the connection switching unit, the connection switching unit switches the connection condition of the stator windings to the first connection condition by connecting the second winding terminal of the first open winding and the fourth winding terminal of the second open winding together via the semiconductor switch, the stator windings further include a third open winding, the third open winding has a fifth winding terminal connected to the inverter and a sixth winding terminal connected to the connection switching unit, the connection switching unit switches the connection condition of the stator windings to star connection as the first connection condition by connecting the second winding terminal of the first open winding, the fourth winding terminal of the second open winding, and the sixth winding terminal of the third open winding together via the semiconductor switch, and the connection switching unit switches the connection condition of the stator windings to delta connection as the second connection condition by connecting the second winding terminal of the first open winding, the fourth winding terminal of the second open winding, and the sixth winding terminal of the third open winding to the inverter via the semiconductor switch.

7. A motor driving device for driving a motor including stator windings, comprising:

a connection switching unit that includes a circuit including a semiconductor switch and switches connection condition of the stator windings to either of first connection condition and second connection condition different from the first connection condition by setting the semiconductor switch to ON or OFF; and an inverter that supplies AC drive currents to the stator windings, the motor driving device performing switching of the semiconductor switch between an ON state and an OFF state in a dead time period when the inverter does not supply the AC drive currents to the stator windings, wherein the stator windings include a first open winding and a second open winding, the first open winding has a first winding terminal connected to the inverter and a second winding terminal connected to the connection switching unit, the second open winding has a third winding terminal connected to the inverter and a fourth winding terminal connected to the connection switching unit, the connection switching unit switches the connection condition of the stator windings to the first connection condition by connecting the second winding terminal of the first open winding and the fourth winding terminal of the second open winding together via the semiconductor switch, the stator windings further include a third open winding, the third open winding has a fifth winding terminal connected to the inverter and a sixth winding terminal connected to the connection switching unit, the connection switching unit switches the connection condition of the stator windings to star connection as the first connection condition by connecting the second winding terminal of the first open winding, the fourth winding terminal of the second open winding, and the sixth winding terminal of the third open winding together via the semiconductor switch, the circuit including the semiconductor switch includes a first switch circuit, a second switch circuit and a third switch circuit, the first switch circuit has a first terminal connected to the inverter, a second terminal, and a third terminal connected to the second winding terminal of the first open winding and connected to one of the first terminal and the second terminal, the second switch circuit has a fourth terminal connected to the inverter, a fifth terminal connected to the second terminal, and a sixth terminal connected to the fourth winding terminal of the second open winding and connected to one of the fourth terminal and the fifth terminal, the third switch circuit has a seventh terminal connected to the inverter, an eighth terminal connected to the second terminal and the fifth terminal, and a ninth terminal connected to the sixth winding terminal of the third open winding and connected to one of the seventh terminal and the eighth terminal, and the connection switching unit switches the connection condition of the stator windings to star connection that is the first connection condition by connecting the second terminal and the third terminal together, connecting the fifth terminal and the sixth terminal together, and connecting the eighth terminal and the ninth terminal together.

8. The motor driving device according to claim 7, wherein the connection switching unit switches the connection condition of the stator windings to delta connection that is the second connection condition by connecting the first terminal and the third terminal together, connecting the fourth terminal and the sixth terminal together, and connecting the seventh terminal and the ninth terminal together.

9. The motor driving device according to claim 7, wherein the first switch circuit includes:

a first MOS transistor;

a first diode connected in series with the first MOS transistor and capable of conducting current in a direction heading from the first terminal to the third terminal;

a second MOS transistor;

a second diode connected in series with the second MOS transistor and capable of conducting current in a direction heading from the third terminal to the first terminal;

a third MOS transistor;

a third diode connected in series with the third MOS transistor and capable of conducting current in a direction heading from the second terminal to the third terminal;

a fourth MOS transistor; and a fourth diode connected in series with the fourth MOS transistor and capable of conducting current in a direction heading from the third terminal to the second terminal, the second switch circuit includes:

a fifth MOS transistor;

a fifth diode connected in series with the fifth MOS transistor and capable of conducting current in a direction heading from the fourth terminal to the sixth terminal;

a sixth MOS transistor;

a sixth diode connected in series with the sixth MOS transistor and capable of conducting current in a direction heading from the sixth terminal to the fourth terminal;

a seventh MOS transistor;
a seventh diode connected in series with the seventh MOS transistor and capable of conducting current in a direction heading from the fifth terminal to the sixth terminal;
an eighth MOS transistor; and
an eighth diode connected in series with the eighth MOS transistor and capable of conducting current in a direction heading from the sixth terminal to the fifth terminal, and
the third switch circuit includes:
a ninth MOS transistor;
a ninth diode connected in series with the ninth MOS transistor and capable of conducting current in a direction heading from the seventh terminal to the ninth terminal;
a tenth MOS transistor;
a tenth diode connected in series with the tenth MOS transistor and capable of conducting current in a direction heading from the ninth terminal to the seventh terminal;
an eleventh MOS transistor;
an eleventh diode connected in series with the eleventh MOS transistor and capable of conducting current in a direction heading from the eighth terminal to the ninth terminal;
a twelfth MOS transistor; and
a twelfth diode connected in series with the twelfth MOS transistor and capable of conducting current in a direction heading from the ninth terminal to the eighth terminal.

10. The motor driving device according to claim 9, wherein the connection switching unit switches the connection condition of the stator windings to star connection that is the first connection condition by setting the first, second, fifth, sixth, ninth and tenth MOS transistors in an OFF state and setting the third, fourth, seventh, eighth, eleventh and twelfth MOS transistors in an ON state.

11. The motor driving device according to claim 9, wherein the connection switching unit switches the connection condition of the stator windings to delta connection that is the second connection condition by setting the first, second, fifth, sixth, ninth and tenth MOS transistors in an ON state and setting the third, fourth, seventh, eighth, eleventh and twelfth MOS transistors in an OFF state.

12. The motor driving device according to claim 7, wherein
the first switch circuit includes:
a first MOS transistor;
a second MOS transistor connected in series with the first MOS transistor;
a first diode connected in parallel with the second MOS transistor and capable of conducting current in a direction heading from the first terminal to the third terminal;
a third MOS transistor;
a fourth MOS transistor connected in series with the third MOS transistor;
a second diode connected in parallel with the fourth MOS transistor and capable of conducting current in a direction heading from the third terminal to the first terminal;
a fifth MOS transistor;
a sixth MOS transistor connected in series with the fifth MOS transistor;
a third diode connected in parallel with the sixth MOS transistor and capable of conducting current in a direction heading from the second terminal to the third terminal;
a seventh MOS transistor;
an eighth MOS transistor connected in series with the seventh MOS transistor; and
a fourth diode connected in parallel with the eighth MOS transistor and capable of conducting current in a direction heading from the third terminal to the second terminal,
the second switch circuit includes:
a ninth MOS transistor;
a tenth MOS transistor connected in series with the ninth MOS transistor;
a fifth diode connected in parallel with the tenth MOS transistor and capable of conducting current in a direction heading from the fourth terminal to the sixth terminal;
an eleventh MOS transistor;
a twelfth MOS transistor connected in series with the eleventh MOS transistor;
a sixth diode connected in parallel with the twelfth MOS transistor and capable of conducting current in a direction heading from the sixth terminal to the fourth terminal;
a thirteenth MOS transistor;
a fourteenth MOS transistor connected in series with the thirteenth MOS transistor;
a seventh diode connected in parallel with the fourteenth MOS transistor and capable of conducting current in a direction heading from the fifth terminal to the sixth terminal;
a fifteenth MOS transistor;
a sixteenth MOS transistor connected in series with the fifteenth MOS transistor; and
an eighth diode connected in parallel with the sixteenth MOS transistor and capable of conducting current in a direction heading from the sixth terminal to the fifth terminal, and
the third switch circuit includes:
a seventeenth MOS transistor;
an eighteenth MOS transistor connected in series with the seventeenth MOS transistor;
a ninth diode connected in parallel with the eighteenth MOS transistor and capable of conducting current in a direction heading from the seventh terminal to the ninth terminal;
a nineteenth MOS transistor;
a twentieth MOS transistor connected in series with the nineteenth MOS transistor;
a tenth diode connected in parallel with the twentieth MOS transistor and capable of conducting current in a direction heading from the ninth terminal to the seventh terminal;
a twenty-first MOS transistor;
a twenty-second MOS transistor connected in series with the twenty-first MOS transistor;
an eleventh diode connected in parallel with the twenty-second MOS transistor and capable of conducting current in a direction heading from the eighth terminal to the ninth terminal;
a twenty-third MOS transistor;
a twenty-fourth MOS transistor connected in series with the twenty-third MOS transistor; and a twelfth diode connected in parallel with the twenty-fourth MOS transistor and capable of conducting current in a direction heading from the ninth terminal to the eighth terminal.

13. The motor driving device according to claim 12, wherein the connection switching unit switches the connection condition of the stator windings to star connection that is the first connection condition by setting the fifth, seventh, thirteenth, fifteenth, twenty-first and twenty-third MOS transistors in an ON state and setting the first to fourth, sixth, eighth, ninth to twelfth, fourteenth, sixteenth, seventeenth to twentieth, twenty-second and twenty-fourth MOS transistors in an OFF state.

14. The motor driving device according to claim 12, wherein the connection switching unit switches the connection condition of the stator windings to delta connection that is the second connection condition by setting the first, third, ninth, eleventh, seventeenth and nineteenth MOS transistors in an ON state and setting the second, fourth to eighth, tenth, twelfth to sixteenth, eighteenth, and twentieth to twenty-fourth MOS transistors in an OFF state.

15. The motor driving device according to claim 12, wherein the connection switching unit switches the connection condition of the stator windings to star connection that is the first connection condition by setting the fifth, seventh, thirteenth, fifteenth, twenty-first and twenty-third MOS transistors in an ON state and setting the first, third, ninth, eleventh, seventeenth and nineteenth MOS transistors in an OFF state.

16. The motor driving device according to claim 12, wherein the connection switching unit switches the connection condition of the stator windings to delta connection that is the second connection condition by setting the first, third, ninth, eleventh, seventeenth and nineteenth MOS transistors in an ON state and setting the fifth, seventh, thirteenth, fifteenth, twenty-first and twenty-third MOS transistors in an OFF state.

* * * * *